(12) United States Patent
Fan et al.

(10) Patent No.: US 11,880,628 B2
(45) Date of Patent: Jan. 23, 2024

(54) SCREEN MIRRORING DISPLAY METHOD AND ELECTRONIC DEVICE

(71) Applicant: Huawei Technologies Co., Ltd., Shenzhen (CN)

(72) Inventors: Zhenhua Fan, Nanjing (CN); Yuan Cao, Nanjing (CN); Xi Wei, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 131 days.

(21) Appl. No.: 17/616,901

(22) PCT Filed: Jun. 2, 2020

(86) PCT No.: PCT/CN2020/093892
§ 371 (c)(1),
(2) Date: Aug. 22, 2022

(87) PCT Pub. No.: WO2020/244495
PCT Pub. Date: Dec. 10, 2020

(65) Prior Publication Data
US 2022/0391161 A1    Dec. 8, 2022

(30) Foreign Application Priority Data
Jun. 5, 2019    (CN) .......................... 201910487829.1

(51) Int. Cl.
*G06F 3/14* (2006.01)
(52) U.S. Cl.
CPC ................... *G06F 3/1454* (2013.01)

(58) Field of Classification Search
CPC ...... G06F 3/1454; G06F 3/1423; G06F 9/452; G06F 3/1438
See application file for complete search history.

(56) References Cited

U.S. PATENT DOCUMENTS

| | | | |
|---|---|---|---|
| 2014/0078020 A1* | 3/2014 | Yamada | G06F 3/1454 345/1.1 |
| 2015/0268919 A1 | 9/2015 | Zhang | |
| 2017/0235435 A1 | 8/2017 | Sohn et al. | |
| 2017/0255442 A1 | 9/2017 | Kim et al. | |

(Continued)

FOREIGN PATENT DOCUMENTS

| | | |
|---|---|---|
| CN | 103744810 A | 4/2014 |
| CN | 103986935 A | 8/2014 |
| CN | 104951415 A | 9/2015 |

(Continued)

*Primary Examiner* — Abbas I Abdulselam
(74) *Attorney, Agent, or Firm* — Conley Rose, P.C.

(57) ABSTRACT

A screen mirroring display method implemented by a first electronic device, where the method includes displaying a first display interface, receiving a screen mirroring instruction for projecting the first display interface onto a second electronic device, determining a first target control in the first display interface in response to the screen mirroring instruction, and sending a first message to the second electronic device, where the first message includes a drawing instruction of the first target control to prompt the second electronic device to draw a first screen mirroring interface according to the drawing instruction, where the first screen mirroring interface includes the first target control.

20 Claims, 22 Drawing Sheets

(56) References Cited

U.S. PATENT DOCUMENTS

2020/0183525 A1  6/2020  Liu et al.

FOREIGN PATENT DOCUMENTS

| | | | |
|---|---|---|---|
| CN | 105100907 | A | 11/2015 |
| CN | 106331669 | A | 1/2017 |
| CN | 107493375 | A | 12/2017 |
| CN | 108713185 | A | 10/2018 |
| CN | 108958684 | A | 12/2018 |
| CN | 109218731 | A | 1/2019 |
| CN | 109508162 | A | 3/2019 |
| CN | 110377250 | A | 10/2019 |
| CN | 110381195 | A | 10/2019 |
| CN | 110389736 | A | 10/2019 |
| CN | 111190558 | A | 5/2020 |
| EP | 3021562 | A1 | 5/2016 |
| EP | 3451654 | A1 | 3/2019 |
| EP | 3951585 | A1 | 2/2022 |
| WO | 2015036649 | A1 | 3/2015 |
| WO | 2019036942 | A1 | 2/2019 |

\* cited by examiner

SCREEN MIRRORING DISPLAY METHOD AND ELECTRONIC DEVICE

CROSS-REFERENCE TO RELATED APPLICATIONS

This is a U.S. National Stage of International Patent Application No. PCT/CN2020/093892 filed on Jun. 2, 2020, which claims priority to Chinese Patent Application No. 201910487829.1 filed on Jun. 5, 2019. Both of the aforementioned applications are hereby incorporated by reference in their entireties.

TECHNICAL FIELD

This application relates to the field of terminal technologies, and in particular, to a screen mirroring display method and an electronic device.

BACKGROUND

With development of a smart household technology, one user or family often has a plurality of electronic devices that can communicate with each other. Various electronic devices generally have respective device characteristics. For example, a mobile phone is more portable, a television screen has a better display effect, and sound quality of a sound box is better. To give full play to device characteristics of different electronic devices, the electronic device can implement switching and display of multimedia data between a plurality of devices through screen mirroring or the like.

For example, a user may send, for display, content displayed on a mobile phone (namely, a source device) to another destination device that supports a screen mirroring function. However, because specifications such as resolution and sizes of a display screen in the destination device and a display screen in the source device may be different, when the destination device displays content sent by the source device, a problem of inability to display or a poor display effect may occur.

SUMMARY

This application provides a screen mirroring display method and an electronic device. A destination device can arrange, based on a device characteristic of the destination device, display content sent by a source device, so that a display effect and user experience of screen mirroring display between a plurality of devices are improved.

To achieve the foregoing objective, the following technical solutions are used in this application.

According to a first aspect, this application provides a screen mirroring display method, including: A first electronic device (namely, a source device) displays a first display interface. The first electronic device receives a screen mirroring instruction for projecting the first display interface onto a second electronic device (namely, a destination device 1) by a user. In response to the screen mirroring instruction, the first electronic device may determine one or more first target controls on which screen mirroring needs to be performed in the first display interface. Further, the first electronic device may send a first message to the second electronic device, where the first message includes a drawing instruction of the first target control, so that the second electronic device draws, according to the drawing instruction of the first target control, a first screen mirroring interface including the first target control.

In other words, during screen mirroring display, the source device may project one or more controls in the display interface of the source device onto the screen mirroring interface of the destination device, so that the display interface of the source device can be displayed on the destination device after being transformed or recombined, to more flexibly adapt to a device characteristic such as a screen size of the destination device and improve a display effect and use experience in a screen mirroring scenario.

In a possible implementation, that the first electronic device determines a first target control in the first display interface specifically includes: The first electronic device may obtain, based on a type of the second electronic device, a configuration file corresponding to the first display interface, where the configuration file records the first target control on which screen mirroring needs to be performed in the first display interface. Further, the first electronic device may determine the first target control in the first display interface based on the configuration file.

For example, the configuration file may record an identifier of the first target control in the first display interface. In this case, that the first electronic device determines the first target control in the first display interface based on the configuration file specifically includes: The first electronic device determines, based on the identifier of the first target control in the first display interface, the first target control on which screen mirroring currently needs to be performed.

Alternatively, the configuration file may record a display location of the first target control in the first display interface. In this case, that the first electronic device determines the first target control in the first display interface based on the configuration file specifically includes: The first electronic device determines, based on the display location of the first target control in the first display interface, the first target control on which screen mirroring currently needs to be performed.

In a possible implementation, after the first electronic device determines the one or more first target controls in the first display interface, the method further includes: The first electronic device obtains first view information (for example, a view tree of the first display interface) for drawing the first display interface, where the first view information includes a layer order of controls in the first display interface. Further, the first electronic device may determine second view information based on the first view information, where the second view information includes a layer order of the first target controls in the first screen mirroring interface.

It can be learned that the source device may change, for example, split, delete, or recombine the controls in the display interface of the source device, so that a new screen mirroring interface is displayed on the destination device to adapt to a device characteristic such as a display size of the destination device, thereby improving a display effect of the destination device and user experience in a screen mirroring scenario.

In addition, the first message sent by the source device to the destination device may further include the second view information, so that the second electronic device sequentially invokes drawing instructions of the first target controls based on the layer order of the first target controls in the second view information, to draw the first screen mirroring interface.

In a possible implementation, that the first electronic device determines second view information based on the first view information includes: The first electronic device splits and recombines the first target controls in the first view information to obtain the second view information. In this case, layer orders of the first target controls in the first view information and the second view information are the same, in other words, a layer relationship between the first target controls in the first display interface that exists before screen mirroring is the same as a layer relationship between the first target controls in the first screen mirroring interface that exists after screen mirroring.

In a possible implementation, a configuration file corresponding to the first display interface further records display locations of the first target controls in the first screen mirroring interface. In this case, that the first electronic device determines second view information based on the first view information includes: The first electronic device splits, from the first view information, the first target controls on which screen mirroring needs to be performed. Further, the first electronic device may recombine the first target controls based on the display locations of the first target control in the first screen mirroring interface that are recorded in the configuration file, to obtain the second view information. In this case, a location and a layer in which the first target control is located after screen mirroring may be the same as or different from a location and a layer in which the first target control is located before screen mirroring.

In a possible implementation, the first message may further include a drawing resource such as an icon or a profile photo of the first target control, and the drawing resource of the first target control is used by the second electronic device to draw a user interface of the first target control by using the drawing resource when the second electronic device executes the drawing instruction of the first target control.

In a possible implementation, after the first electronic device displays the first display interface, the method further includes: The first electronic device receives a screen mirroring instruction for projecting the first display interface onto a third electronic device (namely, a destination device 2) by the user. The first electronic device determines a second target control in the first display interface in response to the screen mirroring instruction. A method for determining the second target control by the first electronic device is similar to the method for determining the first target control by the first electronic device. After determining the second target control, similar to sending the first message to the second electronic device by the first electronic device, the first electronic device may send, to the third electronic device, a second message carrying a drawing instruction of the second target control. Alternatively, after determining the second target control, the first electronic device may also add a drawing instruction of the second target control to the first message, and in this case, the first electronic device may send the first message to both the second electronic device and the third electronic device. In this way, the first electronic device can simultaneously project different controls in the display interface of the first electronic device onto a plurality of destination devices for display.

According to a second aspect, this application provides a screen mirroring display method, including: A second electronic device (namely, a destination device) may receive a first message sent by a first electronic device (namely, a source device), where the first message includes drawing instructions of N (N is an integer greater than 0) controls. The second electronic device may draw a first screen mirroring interface according to the drawing instructions of the N controls, where the first screen mirroring interface includes at least one of the N controls.

In a possible implementation, the first message further includes first view information corresponding to the N controls, and the first view information includes a layer order of the N controls. In this case, that the second electronic device draws a first screen mirroring interface according to the drawing instructions of the N controls specifically includes: The second electronic device may determine a drawing order of the N controls based on the layer order of the N controls in the first view information. Further, the second electronic device may separately execute, based on the drawing order, the drawing instructions corresponding to the N controls to draw the N controls to obtain the first screen mirroring interface.

In a possible implementation, the first message further includes an identifier of a first application interface to which the first target control belongs. Therefore, after the second electronic device receives the first message sent by the first electronic device, the method further includes: The second electronic device obtains a configuration file corresponding to the identifier of the first application interface, where the configuration file records display locations that are of the N controls in the first screen mirroring interface and that exist after screen mirroring. In this case, that the second electronic device draws a first screen mirroring interface according to the drawing instructions of the N controls includes: The second electronic device executes, based on the drawing order of the N controls that is indicated in the first view information, a drawing instruction of each control at a corresponding display location recorded in the configuration file, to sequentially draw the N controls to obtain the first screen mirroring interface.

In a possible implementation, the first message further includes an identifier of a first application interface to which the first target control belongs. Therefore, after the second electronic device receives the first message sent by the first electronic device, the method further includes. The second electronic device obtains a configuration file corresponding to the identifier of the first application interface, where the configuration file records display locations of M (M is an integer not greater than N) target controls in the first screen mirroring interface, and the M target controls are a subset of the N controls. In other words, if the M target controls on which screen mirroring to the destination device needs to be performed for display are some of the N controls in the first message, the second electronic device may determine, from the N controls based on the configuration file, the M target controls that need to be displayed in the first screen mirroring interface. In this case, that the second electronic device draws a first screen mirroring interface according to the drawing instructions of the N controls includes: The second electronic device determines drawing instructions of the currently used M target controls from the drawing instructions of the N controls. Further, the second electronic device may draw the M target controls according to the drawing instructions of the M target controls, to obtain the first screen mirroring interface.

For example, after the second electronic device determines, from the N controls based on the configuration file, the M target controls that need to be displayed in the first screen mirroring interface, the method further includes: The second electronic device generates, based on the configuration file, second view information after screen mirroring, where the second view information includes a layer order of the M target controls in the first screen mirroring interface.

In this case, that the second electronic device draws the M target controls according to the drawing instructions of the M target controls, to obtain the first screen mirroring interface includes: The second electronic device may separately invoke drawing instructions of corresponding target controls based on a drawing order of the M target controls that is indicated in the second view information, to draw the target controls at corresponding display locations recorded in the configuration file, to finally obtain the first screen mirroring interface.

According to a third aspect, this application provides an electronic device, and the electronic device may be the foregoing source device or the foregoing destination device. The electronic device includes a touchscreen, a communications module, one or more processors, one or more memories, and one or more computer programs. The processor is coupled to the communications module, the touchscreen, and the memory, the one or more computer programs are stored in the memory, and when the electronic device runs, the processor executes the one or more computer programs stored in the memory, so that the electronic device performs the screen mirroring display method according to any one of the foregoing.

According to a fourth aspect, this application provides a computer storage medium, including computer instructions. When the computer instructions run on an electronic device, the electronic device performs the screen mirroring display method according to any implementation of the first aspect.

According to a fifth aspect, this application provides a computer program product. When the computer program product runs on an electronic device, the electronic device performs the screen mirroring display method according to any implementation of the first aspect.

According to a sixth aspect, this application provides a screen mirroring display system. The system may include at least one source device and at least one destination device, the source device may be configured to perform the screen mirroring display method according to any implementation of the first aspect, and the destination device may be configured to perform the screen mirroring display method according to any implementation of the second aspect.

It may be understood that the electronic device in the third aspect, the computer storage medium in the fourth aspect, the computer program product in the fifth aspect, and the system in the sixth aspect that are provided above are all configured to perform the corresponding methods provided above. Therefore, for beneficial effects that can be achieved by the electronic device, the computer storage medium, the computer program product, and the system, refer to beneficial effects in the corresponding methods provided above. Details are not described herein again.

DESCRIPTION OF EMBODIMENTS

The following describes the implementations of the embodiments in detail with reference to the accompanying drawings.

Figure 1:
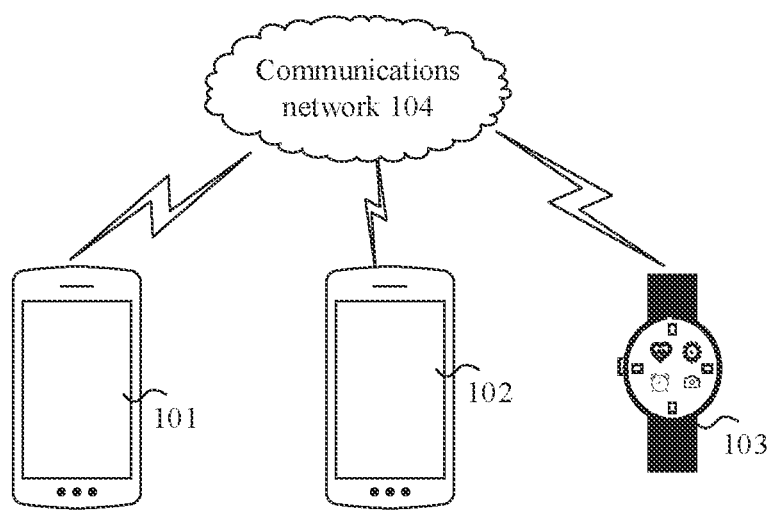
FIG. 1 is a schematic architectural diagram of a communications system according to an embodiment of this application.

As shown in FIG. 1, a screen mirroring display method provided in the embodiments of this application may be applied to a communications system 100, and the communications system 100 may include N (N>1) electronic devices. For example, the communications system 100 may include an electronic device 101 and an electronic device 102.

For example, the electronic device 101 may be connected to the electronic device 102 through one or more communications networks 104.

The communications network 104 may be a wired network, or may be a wireless network. For example, the communications network 104 may be a local area network (local area network. LAN), or may be a wide area network (wide area network, WAN) such as the Internet. The communications network 104 may be implemented by using any known network communication protocol. The network communication protocol may be various wired or wireless communication protocols, for example, Ethernet, a universal serial bus (universal serial bus, USB), firewire (firewire), a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), Bluetooth, wireless fidelity (wireless fidelity, Wi-Fi), NFC, voice over Internet protocol (voice over Internet protocol, VoIP), a communication protocol supporting a network slice architecture, or any other suitable communication protocol. For example, in some embodiments, the electronic device 101 may establish a Wi-Fi connection to the electronic device 102 by using the Wi-Fi protocol.

For example, the electronic device 101 may be used as a source device, and the electronic device 102 may be used as a destination device of the electronic device 101. The electronic device 101 may project a display interface in a display screen onto a display screen of the electronic device 102 for display.

Still as shown in FIG. 1, the communications system 100 may further include an electronic device 103. For example, the electronic device 103 may be a wearable device. In this case, the electronic device 101 may also be used as a source device of the electronic device 103, and also project the display interface in the display screen of the electronic device 101 onto a display screen of the electronic device 103 for display.

In other words, when the electronic device 101 is a source device, the electronic device 101 may simultaneously project the display interface of the electronic device 101 onto a plurality of destination devices (for example, the electronic device 102 and the electronic device 103) for display. Certainly, any electronic device in the communications system 100 may be used as a source device. This is not limited in this embodiment of this application.

In some embodiments, in an example in which the electronic device 101 is a source device, the electronic device 101 may identify each control in the display interface of the electronic device 101 and relationships between locations, layers, and the like of the controls. Further, the electronic device 101 may perform transformation such as splitting, clipping, or recombination on these controls to obtain one or more controls (which may be referred to as target controls below) that need to be projected onto the electronic device 102 (or the electronic device 103). Further, the electronic device 101 may send a drawing instruction related to the target control to the electronic device 102 (or the electronic device 103), so that the electronic device 102 (or the electronic device 103) can draw the target control in a screen mirroring interface displayed on the electronic device 102 (or the electronic device 103).

In some other embodiments, still in the example in which the electronic device 101 is a source device, the electronic device 101 may identify each control in the display interface of the electronic device 101. In addition, the electronic device 101 may send drawing instructions related to these controls to the electronic device 102 (or the electronic device 103). Further, the electronic device 102 (or the electronic device 103) may perform transformation such as splitting, clipping, or recombination on the controls in the electronic device 101 to obtain one or more target controls that currently need to be displayed. Subsequently, the electronic device 102 (or the electronic device 103) may draw the target control on the display screen of the electronic device 102 (or the electronic device 103).

In other words, in a process in which the electronic device 101 (the source device) projects display content onto the electronic device 102 (the destination device), a display interface finally presented by the destination device to a user may be different from a display interface of the source device. In this way, during screen mirroring display, the display interface of the source device may be displayed on the destination device after being clipped, transformed, or recombined, to more flexibly adapt to a device characteristic such as a screen size of the destination device and improve a display effect and use experience in a screen mirroring scenario.

In some embodiments, specific structures of the electronic device 101, the electronic device 102, and the electronic device 103 may be the same or different.

For example, each of the electronic devices may be specifically a mobile phone, a tablet computer, a smart television, a wearable electronic device, an in-vehicle infotainment system, a notebook computer, an ultra-mobile personal computer (ultra-mobile personal computer, UMPC), a handheld computer, a netbook, a personal digital assistant (personal digital assistant, PDA), or a virtual reality device. This is not limited in this embodiment of this application.

Figure 2:
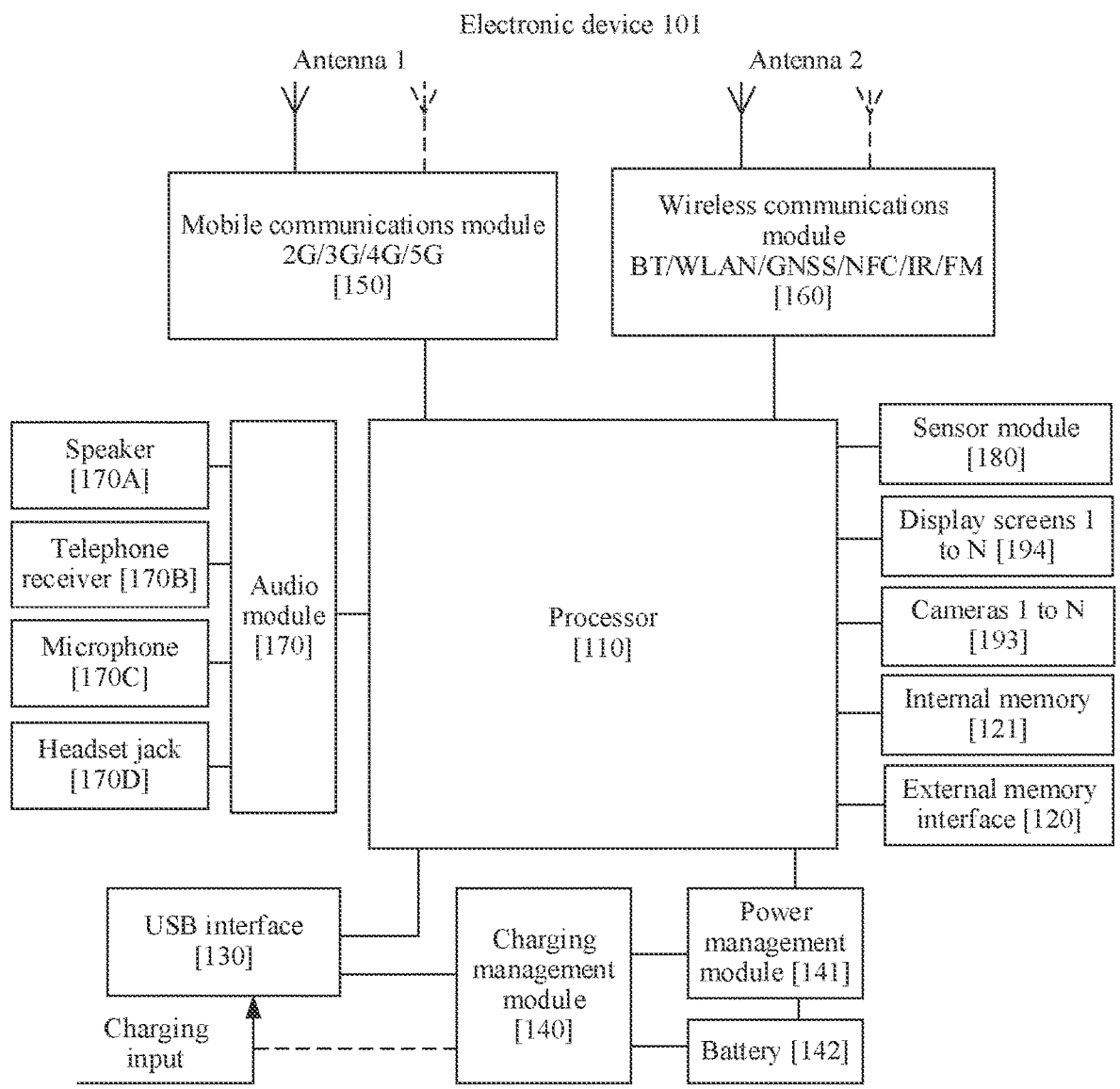
FIG. 2 is a schematic structural diagram 1 of an electronic device according to an embodiment of this application.

The electronic device 101 is used as an example. FIG. 2 is a schematic structural diagram of the electronic device 101.

The electronic device 101 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a telephone receiver 170B, a microphone 170C, a headset jack 170D, a sensor module 180, a camera 193, a display screen 194, and the like.

It may be understood that the structure illustrated in this embodiment of the present invention does not constitute a specific limitation on the electronic device 101. In some other embodiments of this application, the electronic device 101 may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (application processor. AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

A memory may be further disposed in the processor 110, and is configured to store instructions and data. In some embodiments, the memory in the processor 110 is a cache memory. The memory may store instructions or data just used or used cyclically by the processor 110. If the processor 110 needs to use the instructions or the data again, the processor 110 may directly invoke the instructions or the data from the memory. Therefore, repeated access is avoided, and a waiting time of the processor 110 is reduced, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus. USB) interface, and/or the like.

The charging management module 140 is configured to receive charging input from a charger. The charger may be a wireless charger, or may be a wired charger. In some embodiments of wired charging, the charging management module 140 may receive charging input from the wired charger through the USB interface 130. In some embodiments of wireless charging, the charging management module 140 may receive wireless charging input through a wireless charging coil of the electronic device 101. When charging the battery 142, the charging management module 140 may further supply power to the electronic device by using the power management module 141.

The power management module 141 is configured to connect to the battery 142, the charging management module 140, and the processor 110. The power management module 141 receives input from the battery 142 and/or the charging management module 140, and supplies power to the processor 110, the internal memory 121, the display screen 194, the camera 193, the wireless communications module 160, and the like. The power management module 141 may be further configured to monitor parameters such as a battery capacity, a quantity of battery cycles, and a battery health status (leakage or impedance). In some other embodiments, the power management module 141 may also be disposed in the processor 110. In some other embodiments, the power management module 141 and the charging management module 140 may also be disposed in a same component.

A wireless communication function of the electronic device 101 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 101 may be configured to cover one or more communication frequency bands. Different antennas may be multiplexed to improve antenna utilization. For example, the antenna 1 may be multiplexed into a diversity antenna of a wireless local area network. In some other embodiments, the antenna may be used in combination with a tuning switch.

The mobile communications module 150 may provide a solution that is applied to the electronic device 101 and that includes wireless communication such as 2G/3G/4G/5G. The mobile communications module 150 may include one or more filters, switches, power amplifiers, low noise amplifiers (low noise amplifiers, LNAs), and the like. The mobile communications module 150 may receive an electromagnetic wave by using the antenna 1, perform processing such as filtering and amplification on the received electromagnetic wave, and transmit an electromagnetic wave obtained after processing to the modem processor for demodulation. The mobile communications module 150 may further amplify a signal obtained after modulation by the modem processor, and convert the signal into an electromagnetic wave and radiate the electromagnetic wave by using the antenna 1. In some embodiments, at least some functional modules of the mobile communications module 150 may be disposed in the processor 110. In some embodiments, at least some functional modules of the mobile communications module 150 may be disposed in a same component as at least some modules of the processor 110.

The modem processor may include a modulator and a demodulator. The modulator is configured to modulate a to-be-sent low-frequency baseband signal into an intermediate-high-frequency signal. The demodulator is configured to demodulate a received electromagnetic wave signal into a low-frequency baseband signal. Then the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (not limited to the speaker 170A, the telephone receiver 170B, and the like), or displays an image or a video by using the display screen 194. In some embodiments, the modem processor may be a standalone component. In some other embodiments, the modem processor may be independent of the processor 110 and disposed in a same component as the mobile communications module 150 or another functional module.

The wireless communications module 160 may provide a solution that is applied to the electronic device 101 and that includes wireless communication such as a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology. The wireless communications module 160 may be one or more components integrating one or more communication processing modules. The wireless communications module 160 receives an electromagnetic wave by using the antenna 2, performs frequency modulation and filtering processing on the electromagnetic wave signal, and sends a signal obtained after processing to the processor 110. The wireless communications module 160 may further receive a to-be-sent signal from the processor 110, perform frequency modulation and amplification on the to-be-sent signal, and convert the signal into an electromagnetic wave and radiate the electromagnetic wave by using the antenna 2.

In some embodiments, the antenna 1 of the electronic device 101 is coupled to the mobile communications module 150, and the antenna 2 is coupled to the wireless communications module 160, so that the electronic device 101 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC. FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 101 implements a display function by using the GPU, the display screen 194, the application processor, and the like. The GPU is a microprocessor for image processing, and is connected to the display screen 194 and the application processor. The GPU is configured to perform mathematical and geometric calculation for graphics rendering. The processor 110 may include one or more GPUs that execute program instructions to generate or change display information.

The display screen 194 is configured to display an image, a video, and the like. The display screen 194 includes a display panel. The display panel may use a liquid crystal display (liquid crystal display. LCD), an organic light-emitting diode (organic light-emitting diode, OLED), an active-matrix organic light emitting diode (active-matrix organic light emitting diode, AMOLED), a flexible light-emitting diode (flex light-emitting diode. FLED), a mini-LED, a microLED, a micro-OLED, a quantum dot light emitting diode (quantum dot light emitting diode, QLED), or the like. In some embodiments, the electronic device 101 may include one or N display screens 194, where N is a positive integer greater than 1.

The electronic device 101 may implement a photographing function by using the ISP, the camera 193, the video codec, the GPU, the display screen 194, the application processor, and the like.

The ISP is configured to process data fed back by the camera 193. For example, during photographing, a shutter is opened, light is transmitted to a camera photosensitive element by using a lens, an optical signal is converted into an electrical signal, and the camera photosensitive element transmits the electrical signal to the ISP for processing, so that the electrical signal is converted into an image visible to a naked eye. The ISP may further perform algorithm optimization on noise, brightness, and a skin color of the image. The ISP may further optimize parameters such as exposure and a color temperature of a photographing scene. In some embodiments, the ISP may be disposed in the camera 193.

The camera 193 is configured to capture a still image or a video. An optical image of an object is generated by using the lens and projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP, to convert the electrical signal into a digital image signal. The ISP outputs the digital image signal to the DSP for processing. The DSP converts the digital image signal into an image signal in a standard format such as RGB or YUV. In some embodiments, the electronic device 101 may include one or N cameras 193, where N is a positive integer greater than 1.

The digital signal processor is configured to process a digital signal. In addition to a digital image signal, the digital signal processor may process another digital signal. For example, when the electronic device 101 selects a frequency, the digital signal processor is configured to perform Fourier transform and the like on frequency energy.

The video codec is configured to compress or decompress a digital video. The electronic device 101 may support one or more video codecs. In this case, the electronic device 101 may play or record videos in a plurality of encoding formats, for example, moving picture experts group (moving picture experts group, MPEG)-1, MPEG-2. MPEG-3, and MPEG-4.

The external memory interface 120 may be configured to connect to an external storage card such as a micro SD card, to extend a storage capability of the electronic device 101. The external storage card communicates with the processor 110 through the external storage interface 120, to implement a data storage function. For example, a file such as music or a video is stored in the external storage card.

The internal memory 121 may be configured to store one or more computer programs, and the one or more computer programs include instructions. The processor 110 may run the instructions stored in the internal memory 121, so that the electronic device 101 performs the screen mirroring display method provided in some embodiments of this application, various functional applications, data processing, and the like. The internal memory 121 may include a program storage area and a data storage area. The program storage area may store an operating system. The program storage area may further store one or more applications (for example, Photos or Contacts) and the like. The data storage area may store data (for example, a photo or a contact) created in a process of using the electronic device 101, and the like. In addition, the internal memory 121 may include a high-speed random access memory, or may include a non-volatile memory such as one or more magnetic disk storage components, flash memory components, or universal flash storage (universal flash storage, UFS). In some other embodiments, the processor 110 runs the instructions stored in the internal memory 121 and/or instructions stored in the memory disposed in the processor, so that the electronic device 101 performs the screen mirroring display method provided in the embodiments of this application, various functional applications, and data processing.

The electronic device 101 may implement an audio function such as music play or recording by using the audio module 170, the speaker 170A, the telephone receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some function modules of the audio module 170 may be disposed in the processor 110.

The speaker 170A, also referred to as a "horn", is configured to convert an audio electrical signal into a sound signal. The electronic device 101 may listen to music or answer a hands-free call by using the speaker 170A.

The telephone receiver 170B, also referred to as an "earpiece", is configured to convert an audio electrical signal into a sound signal. When answering a call or listening to voice information, the electronic device 101 may listen to a voice by placing the telephone receiver 170B close to an ear.

The microphone 170C is configured to convert a sound signal into an electrical signal. When making a call or sending voice information, a user may utter a voice by making a mouth close to the microphone 170C, and enter a sound signal to the microphone 170C. One or more microphones 170C may be disposed in the electronic device 101. In some other embodiments, two microphones 170C may be disposed in the electronic device 101, to implement a denoising function in addition to collecting a sound signal. In some other embodiments, three, four, or more microphones 170C may be disposed in the electronic device 101, to collect a sound signal, perform denoising, identify a sound source, implement a directional recording function, and the like.

The headset jack 170D is configured to connect to a wired headset. The headset jack 170D may be the USB interface 130, a 3.5 mm open mobile terminal platform (open mobile terminal platform. OMTP) standard interface, or a cellular telecommunications industry association of the USA (cellular telecommunications industry association of the USA, CTIA) standard interface.

The sensor module 180 may include a pressure sensor, a gyroscope sensor, a barometric pressure sensor, a magnetic sensor, an acceleration sensor, a distance sensor, a proximity light sensor, a fingerprint sensor, a temperature sensor, a touch sensor, an ambient light sensor, a bone conduction sensor, and the like.

In addition, the electronic device may further include one or more components such as a key, a motor, an indicator, and a SIM card interface. This is not limited in this embodiment of this application.

A software system of the electronic device 101 may use a hierarchical architecture, an event-driven architecture, a microkernel architecture, a microservice architecture, or a cloud architecture. In the embodiments of this application, an Android system with a hierarchical architecture is used as an example to describe a software structure of the electronic device 101.

Figure 3:
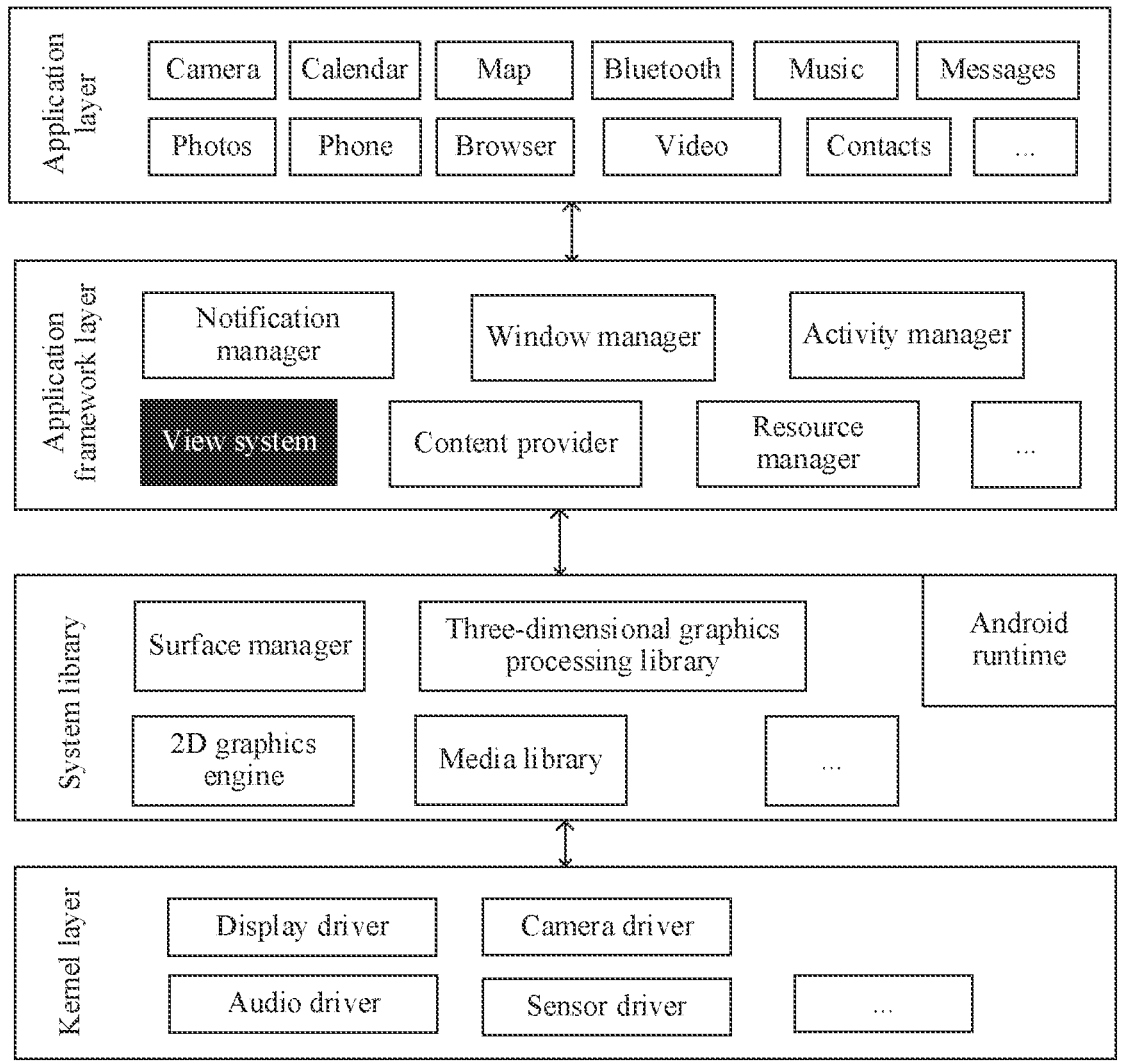
FIG. 3 is a schematic architectural diagram of an operating system in an electronic device according to an embodiment of this application.

FIG. 3 is a block diagram of software of the electronic device 101 according to an embodiment of this application.

In the hierarchical architecture, the software is divided into several layers. Each layer has a clear role and function. The layers communicate with each other through a software interface. In some embodiments, the Android system is divided into four layers from top to bottom: an application layer, an application framework layer. Android runtime (Android runtime) and a system library, and a kernel layer.

1. Application Layer

The application layer may include a series of applications.

As shown in FIG. 3, the applications may include APPs (applications) such as Phone, Contacts, Camera, Photos, Calendar, Map, Navigation, Bluetooth, Music, Video, and Messages.

2. Application Framework Layer

The application framework layer provides an application programming interface (application programming interface, API) and a programming framework for the applications in the application layer. The application framework layer includes some predefined functions.

As shown in FIG. 3, the application framework layer may include a view system (view system), a notification manager, an activity manager, a window manager, a content provider, a resource manager, an input method manager, and the like.

The view system may be configured to construct a display interface of an application. Each display interface may include one or more controls. Generally, the control may include interface elements such as an icon, a button, a menu, a tab, a text box, a dialog box, a status bar, a navigation bar, and a widget (widget).

When drawing the display interface, the view system may obtain view information corresponding to the display interface. The view information records a layer relationship between controls in the display interface that needs to be drawn. For example, the controls in the display interface are usually organized by layer based on a tree structure, to form a complete view tree (view tree), and the view tree may be referred to as the view information of the display interface. The view system may draw the display interface based on the layer relationship between the controls that is set in the view tree. Drawing each control in the display interface corresponds to a group of drawing instructions, for example, DrawLine, DrawPoint, and DrawBitmap. The view system may sequentially invoke drawing instructions of corresponding controls based on the layer relationship between the controls in the view tree, to draw the controls.

Figure 4A:
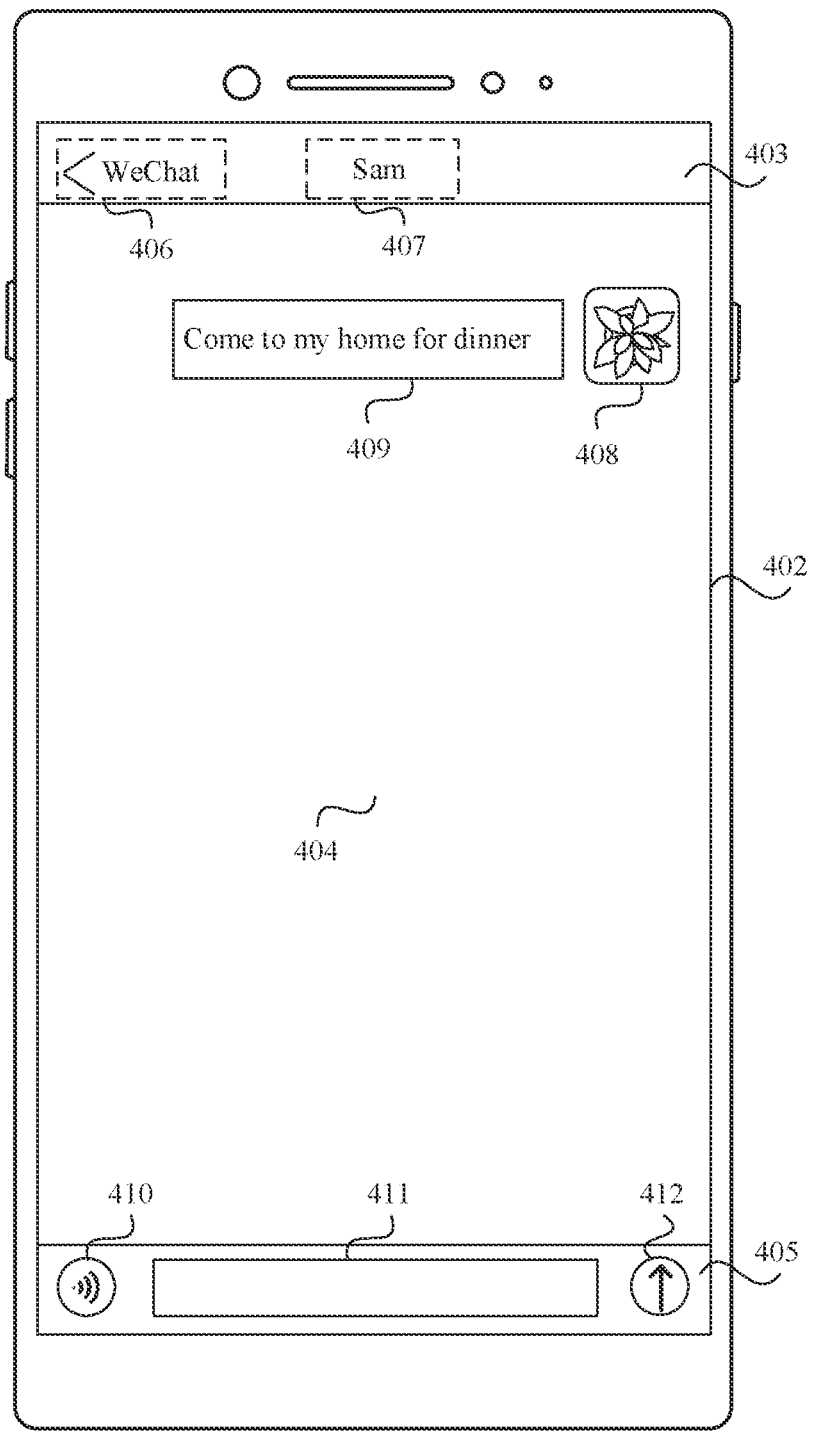
FIG. 4(a) and FIG. 4(b) are a schematic diagram 1 of an application scenario of a screen mirroring display method according to an embodiment of this application.

For example, FIG. 4(a) shows a chat interface 401 of a WeChat APP. A control at a bottommost layer in the chat interface 401 is a root (root) node, a control named a base map 402 is disposed under the root node, and the base map 402 further includes the following controls: a title bar 403, a chat background 404, and an input bar 405. The title bar 403 further includes a back button 406 and a title 407, the chat background 404 further includes a profile photo 408 and a bubble 409, and the input bar 405 further includes a voice input button icon 410, an input box 411, and a sending button 412.

Figure 4B:
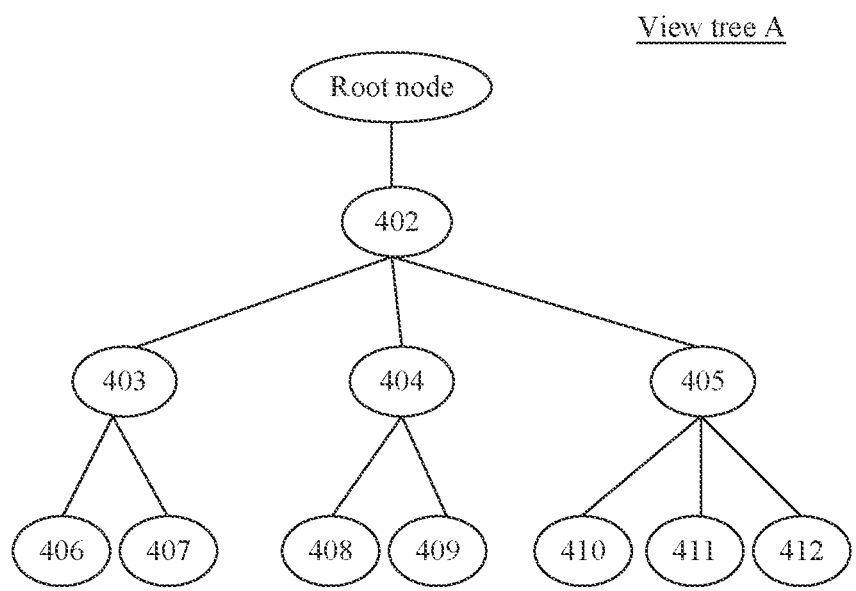

These controls may be layered in order to form a view tree A shown in FIG. 4(b). The base map 402 is located under the root node, and all of the title bar 403, the chat background 404, and the input bar 405 are child nodes of the base map 402. Both the back button 406 and the title 407 are child nodes of the title bar 403. Both the profile photo 408 and the bubble 409 are child nodes of the chat background 404. All of the voice input button icon 410, the input box 411, and the sending button 412 are child nodes of the input bar 405. When drawing the chat interface 401, the view system may invoke a corresponding drawing instruction by layer starting from the root node based on a layer relationship between the controls in the view tree A, to draw each control to finally obtain the chat interface 401.

In this embodiment of this application, a screen mirroring management module may be added to a view system of a source device. After a user enables a screen mirroring function of the source device, the screen mirroring management module may record a drawing instruction for drawing each control in each display interface by the view system and a drawing resource (for example, a profile photo or an icon) required by the drawing instruction. In addition, the screen mirroring management module may determine one or more target controls in a current display interface that need to be projected onto a destination device for display. Further, the screen mirroring management module may generate, based on a view tree 1 of the current display interface, a view tree 2 of the target control in the screen mirroring interface that exists after screen mirroring. A quantity of controls in the view tree 2 may be different from a quantity of controls in the view tree 1, and a location relationship between the controls in the view tree 2 may also be different from a location relationship between the controls in the view tree 1. Further, the screen mirroring management module may instruct the source device to send the view tree 2 and a drawing instruction and a drawing resource of each control in the view tree 2 to the destination device, so that the destination device can invoke a drawing instruction of a corresponding control by layer based on a layer relationship between the controls in the view tree 2, to draw the screen mirroring interface that exists after screen mirroring. In this way, the source device can project, for display, the target control in the display interface of the source device onto the screen mirroring interface displayed on the destination device.

In some other embodiments, a screen mirroring management module may also be added to a view system of the destination device. For example, when the electronic device 101 is a destination device, the electronic device 101 may receive a UI message sent by a source device. The UI message may include a view tree 1 of a display interface of the source device and a drawing instruction and a drawing resource of each control in the view tree 1. Further, the screen mirroring management module may generate, based on the view tree 1, a view tree 2 of a screen mirroring interface that currently needs to be displayed on the destination device. In this way, the destination device can invoke a drawing instruction and a drawing resource of a corresponding control by layer based on a layer relationship between controls in the view tree 2, to draw the screen mirroring interface that exists after screen mirroring.

In other words, in a screen mirroring process, the screen mirroring management module may split, delete, and recombine controls in the display interface of the source device, so that a new screen mirroring interface is displayed on the destination device to adapt to a device characteristic such as a display size of the destination device, thereby improving a display effect of the destination device and user experience in a screen mirroring scenario.

It should be noted that the screen mirroring management module may be separately disposed in the application framework layer and independent of the view system, and this is not limited in this embodiment of this application.

In addition, the activity manager may be configured to manage a lifecycle of each application. The application usually runs in an operating system in a form of an activity. The activity manager may schedule an activity process of the application to manage the lifecycle of each application. The window manager is configured to manage a window program. The window manager may obtain a size of a display screen, determine whether there is a status bar, lock the screen, capture the screen, and the like. The content provider is configured to store and obtain data and make the data accessible to an application. The data may include a video, an image, audio, calls that are made and answered, a browsing history, a bookmark, an address book, and the like. The resource manager provides various resources such as a localized string, an icon, a picture, a layout file, and a video file for an application.

3. Android Runtime and System Library

The Android runtime includes a kernel library and a virtual machine. The Android runtime is responsible for scheduling and management of the Android system.

The kernel library includes two parts: a functional function that needs to be invoked by a Java language and an Android kernel library.

The application layer and the application framework layer run in the virtual machine. The virtual machine executes Java files of the application layer and the application framework layer to obtain binary files. The virtual machine is configured to perform functions such as object lifecycle management, stack management, thread management, security and abnormality management, and garbage collection.

The system library may include a plurality of function modules, for example, a surface manager (surface manager), a media library (media library), a three-dimensional graphics processing library (for example, OpenGL ES), and a 2D graphics engine (for example, an SGL).

The surface manager is configured to manage a display subsystem and provide fusion of 2D and 3D layers for a plurality of applications. The media library supports playback and recording of a plurality of commonly used audio and video formats, a still image file, and the like. The media library may support a plurality of audio and video encoding formats such as MPEG-4, H.264, MP3, AAC, AMR, JPG, and PNG. The three-dimensional graphics processing library is configured to implement three-dimensional graphics drawing, image rendering, composition, layer processing, and the like. The 2D graphics engine is a drawing engine for 2D drawing.

4. Kernel Layer

The kernel layer is a layer between hardware and software. The kernel layer includes at least a display driver, a camera driver, an audio driver, a sensor driver, and the like. This is not limited in this embodiment of this application.

The following describes in detail, by using an example in which a mobile phone is used as a source device during screen mirroring, a screen mirroring display method provided in the embodiments of this application with reference to the accompanying drawings.

For example, a screen mirroring button may be preset in the mobile phone, and the screen mirroring button may be used to project a display interface of the mobile phone onto another electronic device for display. For example, the screen mirroring button may be disposed in a drop-down menu, a pull-up menu, a HiBoard menu, or the like, and this is not limited in this embodiment of this application.

Figure 5A:
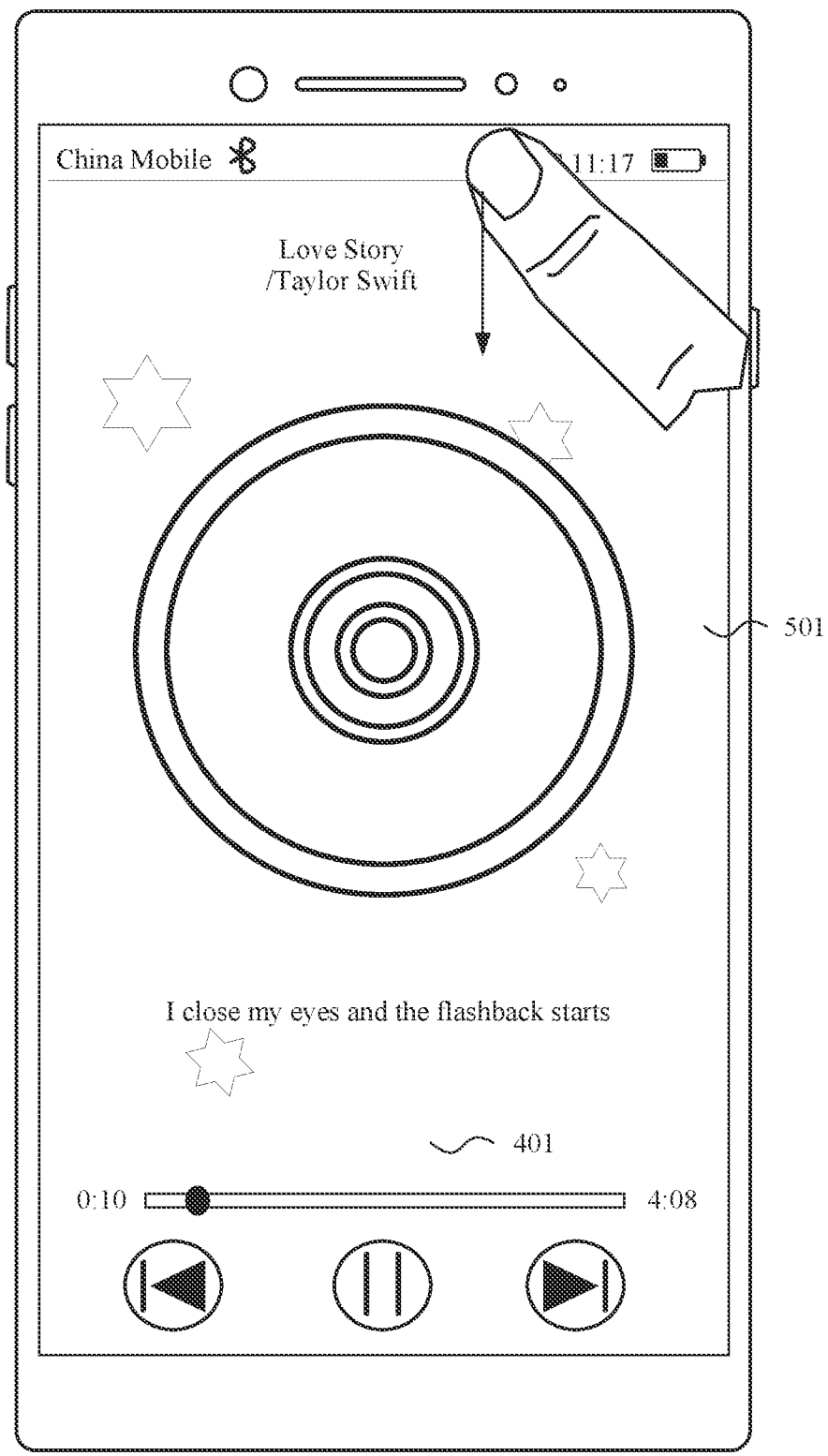
FIG. 5(a) and FIG. 5(b) are a schematic diagram 2 of an application scenario of a screen mirroring display method according to an embodiment of this application.
Figure 5B:
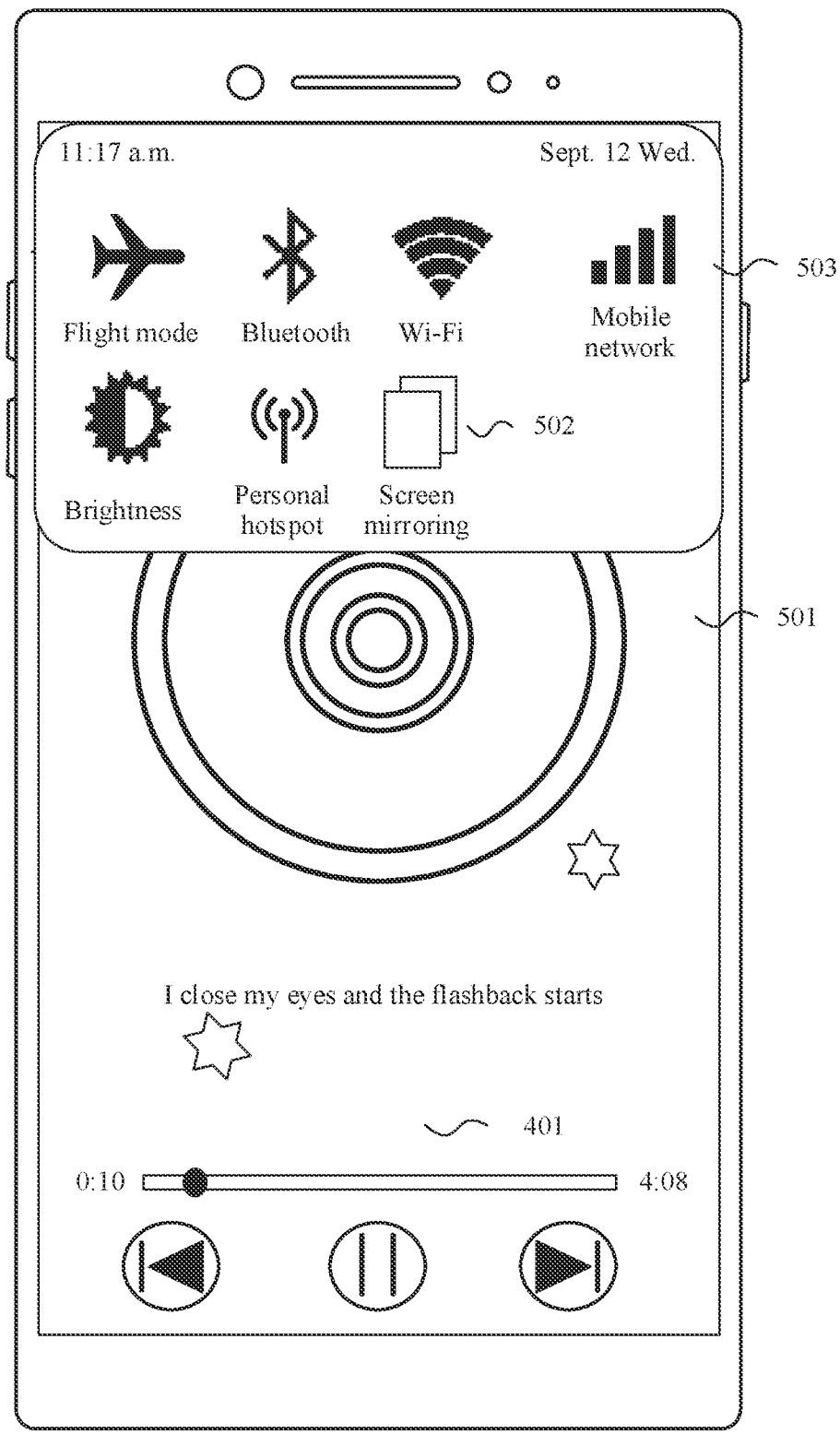

For example, screen mirroring is performed on a display interface of a music APP. As shown in FIG. 5(*a*), when a user plays a song by using the music APP, the mobile phone may display a music playback interface 501 of the music APP. If the user expects to perform screen mirroring on the music playback interface 501 in the mobile phone to another electronic device for further display, the user may perform a preset operation in the music playback interface 501. For example, the preset operation may be a drop-down operation. Further, in response to the drop-down operation performed by the user in the music playback interface 501, as shown in FIG. 5(*b*), the mobile phone may display a drop-down menu 503 including a device switching button 502.

Figure 6A:
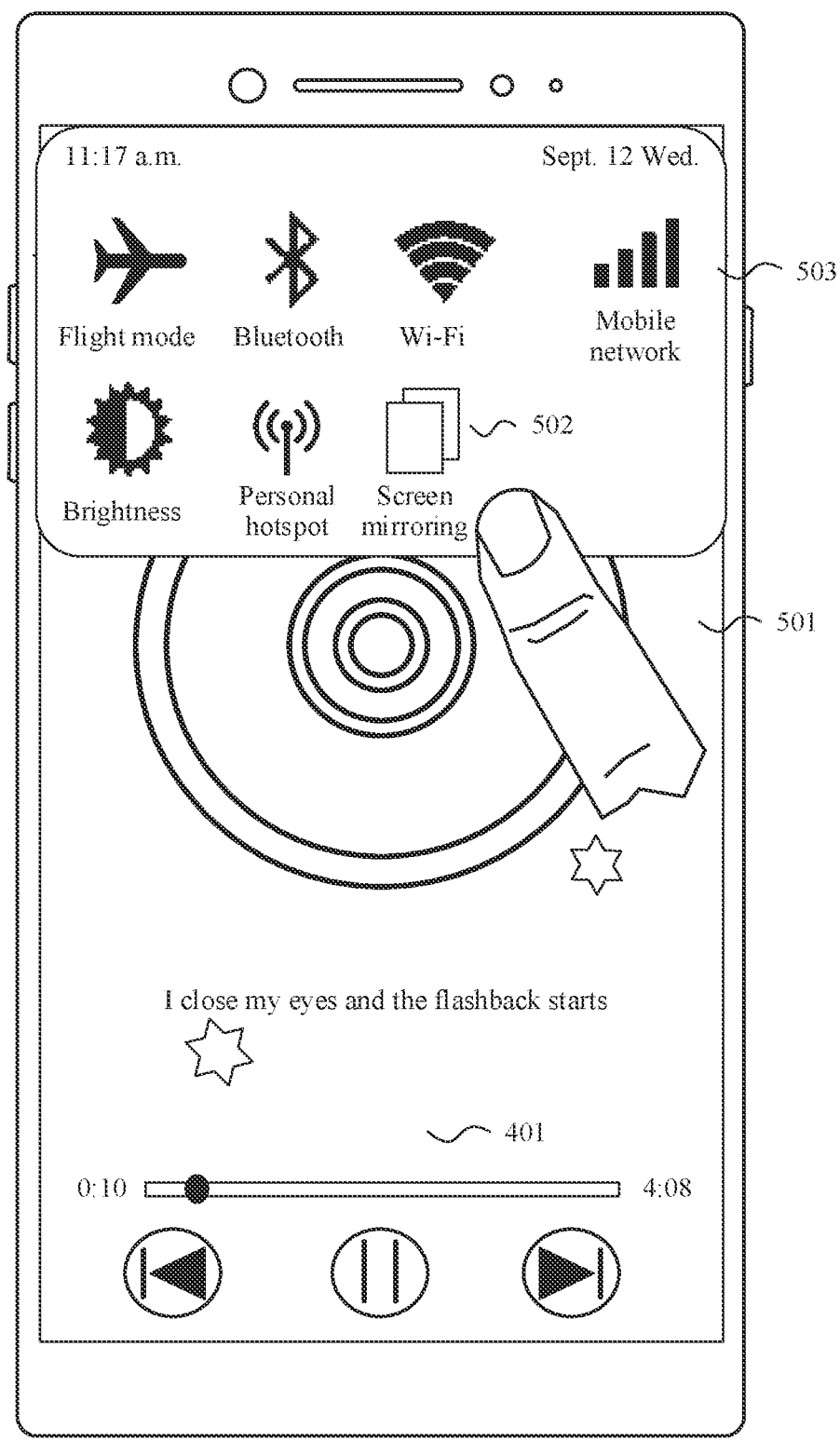
FIG. 6(a) and FIG. 6(b) are a schematic diagram 3 of an application scenario of a screen mirroring display method according to an embodiment of this application.
Figure 6B:
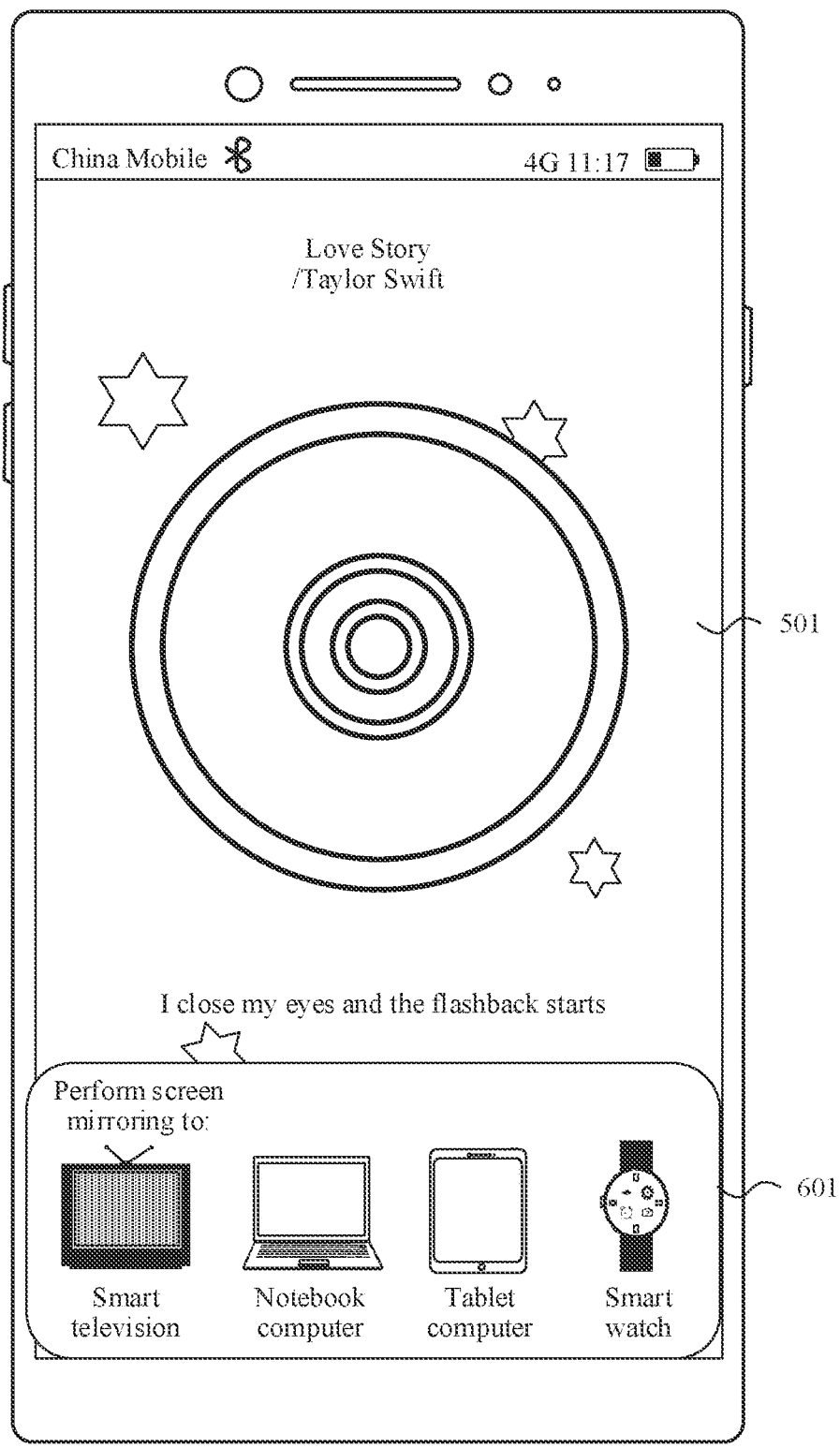

As shown in FIG. 6(*a*), if it is detected that the user selects the screen mirroring button 502, it indicates that the user expects to project the music playback interface 501 currently displayed on the mobile phone onto one or more other electronic devices for further display. As shown in FIG. 6(*b*), the mobile phone may display a prompt box 601, and the prompt box 601 may include one or more candidate devices. The user may select one or more of these candidate devices as destination devices. Subsequently, the mobile phone may project, for screen mirroring display, the music playback interface 501 onto the destination device selected by the user.

For example, after detecting that the user selects the screen mirroring button 502, the mobile phone may query another electronic device located in a same network as the mobile phone. For example, if the mobile phone accesses a Wi-Fi network named "1234", the mobile phone may query electronic devices further included in the Wi-Fi network. If it is found that the Wi-Fi network further includes a smart television, a notebook computer, a tablet computer, and a smart watch, the mobile phone may use these electronic devices as candidate devices, and display icons of these electronic devices in the prompt box 601.

For another example, after detecting that the user selects the screen mirroring button 502, the mobile phone may further request a server to query another electronic device that logs in to a same Huawei account as the mobile phone. Further, the server may send identifiers of one or more found electronic devices that log in to the same Huawei account as the mobile phone. In this way, the mobile phone may use these electronic devices as candidate devices, and display icons of these electronic devices in the prompt box 601.

The plurality of candidate devices in the prompt box 601 are still used as an example. If it is detected that the user selects the smart watch in the prompt box 601, it indicates that the user expects to project the current display interface (namely, the music playback interface 501) in the mobile phone onto the smart watch for display. In this embodiment of this application, the mobile phone may first perform a change such as splitting, clipping, or recombination on display content in the music playback interface 501 to obtain a screen mirroring interface corresponding to the music playback interface 501. Further, the mobile phone may project the screen mirroring interface onto the smart watch for display, so that the screen mirroring interface displayed on the smart watch cannot only reflect content in the music playback interface 501, but also adapt to a screen size of a display screen of the smart watch.

Still in the example in which the music playback interface 501 in the mobile phone is projected onto the smart watch, a plurality of configuration files may be preset for a type of destination device, namely, the smart watch. Each configuration file may correspond to a specific application or a specific display interface. Each configuration file records one or more target controls in the source device that need to be projected onto the destination device.

For example, identifiers of one or more controls in the music playback interface 501 that need to be projected onto the destination device may be recorded in the configuration file. In this case, the mobile phone may determine, based on the identifiers that are of the controls and that are recorded in the configuration file, the target controls on which screen mirroring needs to be performed in the music playback interface 501.

For another example, when music APPs of different versions run the music playback interface 501, identifiers of controls in the music playback interface 501 may be updated, and therefore the target controls determined by using the identifiers of the controls in the configuration file may be inaccurate. In this case, specific display locations, in the music playback interface 501, of one or more controls on which screen mirroring needs to be performed may also be recorded in the configuration file. For example, a location of each control may be uniquely determined by using values of four parameters: left, top, width, and height, where left is a value of a vertex at an upper left corner of the control on an x-axis, top is a value of the vertex at the upper left corner of the control on a y-axis, width is a width of the control, and height is a height of the control. In this way, the mobile phone can uniquely determine, based on the display locations that are of the controls in the music playback interface 501 and that are recorded in the configuration file, the target controls on which screen mirroring needs to be performed in the music playback interface 501.

In addition, in addition to recording the one or more target controls in the source device that need to be projected onto the destination device, the configuration file may record display locations that are of the target controls in a screen mirroring interface and that exist after the target controls are projected onto the destination device.

Figure 7:
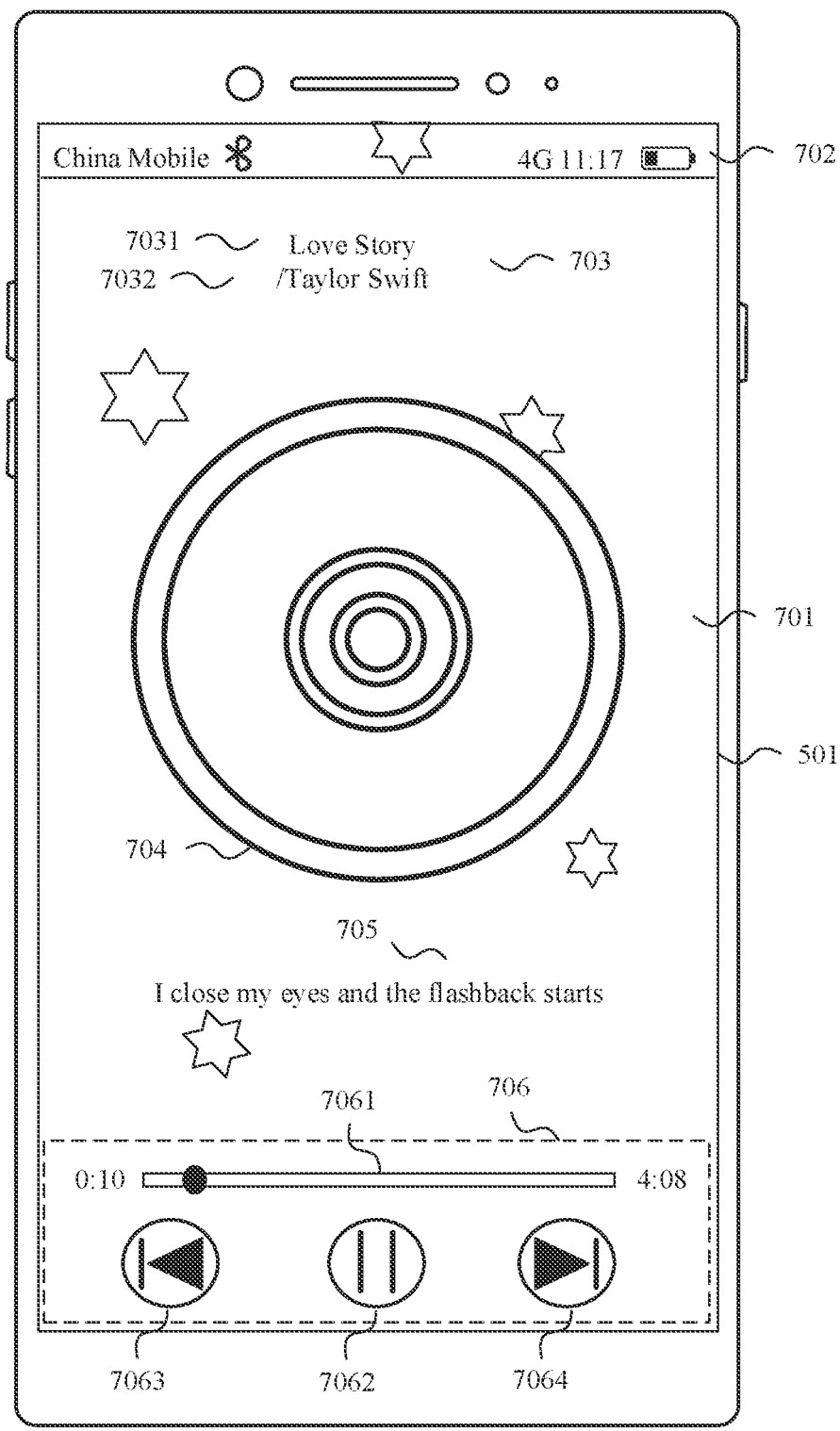
FIG. 7 is a schematic diagram 4 of an application scenario of a screen mirroring display method according to an embodiment of this application.

The music playback interface 501 of the mobile phone shown in FIG. 7 is used as an example. The music playback interface 501 includes the following controls: a base map 701, a status bar 702, a title bar 703, an album cover 704, lyrics 705, and a control bar 706. The status bar 702 includes controls such as time, signal strength, and a battery capacity. The title bar 703 includes controls such as a song name 7031 and a singer 7032. The control bar 706 includes controls such as a progress bar 7061, a pause button 7062, a "previous" button 7063, and a "next" button 7064.

The mobile phone may preset a corresponding configuration file 1 for projecting the music playback interface 501 onto the smart watch. Because the size of the display screen of the smart watch is relatively small, the user projects the music playback interface 501 in the mobile phone onto the smart watch mainly for the purpose of easy control over the music APP. Therefore, a case in which target controls in the music playback interface 501 that need to be projected are the title bar 703 and the control bar 706 may be preset in the configuration file 1. In addition, a display location, in the music playback interface 501, of each control in the title bar 703 and the control bar 706 before screen mirroring and a display location of each control in the title bar 703 and the control bar 706 after screen mirroring may be set in the configuration file 1.

For example, the configuration file 1 corresponding to the music playback interface 501 may be:

```
"packagename": "*****",           //identifier of the application;
"data": [{
        "activityname": "*****",   //identifier of the display interface;
        "data": [{
        "ID": "*****",             //identifier of a target control 1;
        "src1": {                  //display location of the target control 1 in the source device;
              "left": ***,
              "top": ***,
              "width": ***,
              "height": ***
              },
        "dest1": {                 //display location of the target control 1 in the destination device;
              "left": ***,
              "top": ***,
              "width": ***,
              "height": ***
              },
```

```
    "translationx": ***,        //translation distance of the target control 1 on the x-axis;
    "translationy": ***,        //translation distance of the target control 1 on the y-axis;
    "scalex": ***,              //scale ratio of the target control 1 on the x-axis;
    "scaley": ***,              /scale ratio of the target control 1 on the y-axis;
    "rotatedegree": ***,        //rotate degree of the target control 1;
      "order": ***,             //layer of the target control 1;
      "cantouch": true,         //can the target control 1 be touched;
  "src2": ****,
  "dest2": ****,
   ...
  }]
```

It should be noted that the configuration file may be stored in the mobile phone or the server in a format such as a JSON (JavaScript object notation) format, an XML (extensible markup language) format, or a text format, and this is not limited in this embodiment of this application.

The configuration file 1 is still used as an example. If it is detected that the user selects the smart watch in the prompt box 601, the mobile phone may obtain one or more configuration files preset for the smart watch. In addition, the mobile phone may obtain a package name (packagename) of the music application currently running in the foreground and an activity name of the current display interface. Further, the mobile phone may search, based on the package name and the activity name, the obtained configuration files for the configuration file 1 corresponding to the music playback interface 501. Therefore, the mobile phone may identify, based on the ID or location information recorded in the "src" field of the target control 1 in the configuration file 1, one or more target controls in the music playback interface 501 that need to be projected onto the smart watch.

Alternatively, corresponding configuration files may be preset in the mobile phone or the server for smart watches of different models or different display specifications (for example, screen shapes or resolution). After detecting that the user selects the smart watch in the prompt box 601, the mobile phone may further obtain a model or a display specification of a smart watch of current screen mirroring, and search for a configuration file corresponding to the model or the display specification. Certainly, target controls that need to be projected onto smart watches of different models or different display specifications may be recorded in a same configuration file (for example, the configuration file 1). After obtaining the configuration file 1, the mobile phone may find a corresponding "src" field or an ID of a target control in the configuration file 1 based on a model or a display specification of a smart watch of current screen mirroring, to identify one or more target controls that currently need to be projected onto the smart watch for display.

Certainly, if the mobile phone fails to obtain a configuration file corresponding to the smart watch, or the mobile phone fails to obtain a configuration file corresponding to the package name or the activity name of the music application, the mobile phone may project the music playback interface 501 onto the smart watch for display according to an existing screen mirroring solution. This is not limited in this embodiment of this application.

Figure 8:
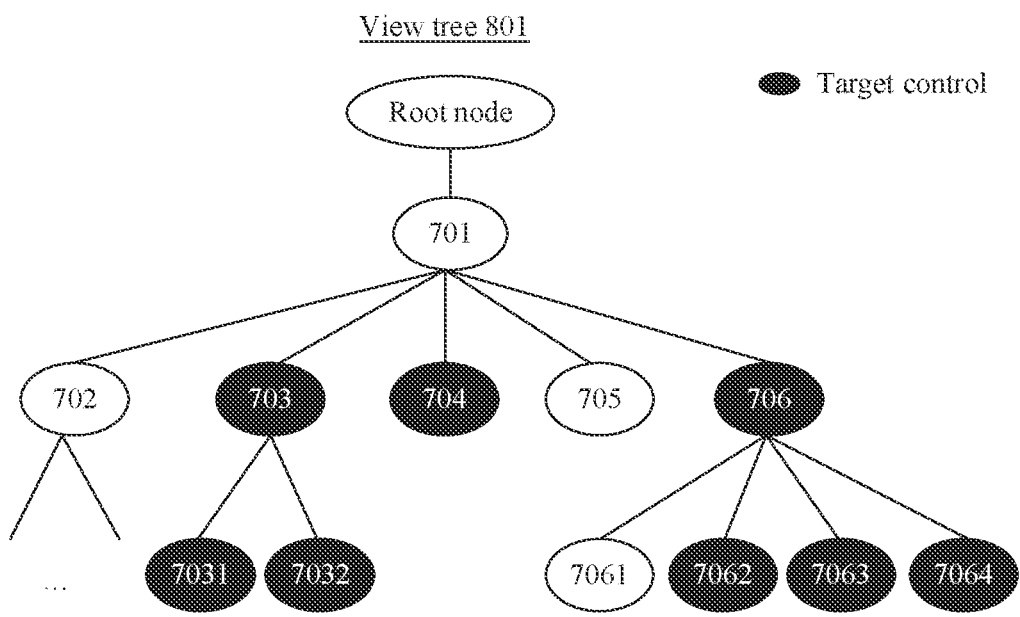
FIG. 8 is a schematic diagram 5 of an application scenario of a screen mirroring display method according to an embodiment of this application.

In addition, after detecting that the user selects the smart watch in the prompt box 601, the mobile phone may further obtain corresponding view information for the view system to draw the music playback interface 501. For example, a view tree is view information. As shown in FIG. 8, a view tree 801 records a layer relationship between the controls in the music playback interface 501. In the view tree 801, a root node of the music playback interface 501 includes a child node named the base map 701, and all of the status bar 702, the title bar 703, the album cover 704, the lyrics 705, and the control bar 706 are child nodes of the base map 701. The song name 7031 and the singer 7041 are child nodes of the title bar 703. The progress bar 7061, the pause button 7062, the "previous" button 7063, and the "next" button 7064 are child nodes of the control bar 706.

For example, target controls in the music playback interface 501 that are identified by the mobile phone based on the configuration file 1 include the song name 7031 and the singer 7041 in the title bar 703, the pause button 7062, the "previous" button 7063, and the "next" button 7064 in the control bar 706, and the album cover 704. Further, because the configuration file 1 records display locations that are of the target controls in the screen mirroring interface and that exist after screen mirroring, the mobile phone may perform operations such as splitting, clipping, and recombination on the view tree 801 of the music playback interface 501 based on the configuration file 1, to generate a view tree 901 of the screen mirroring interface displayed on the smart watch after screen mirroring.

Figure 9:
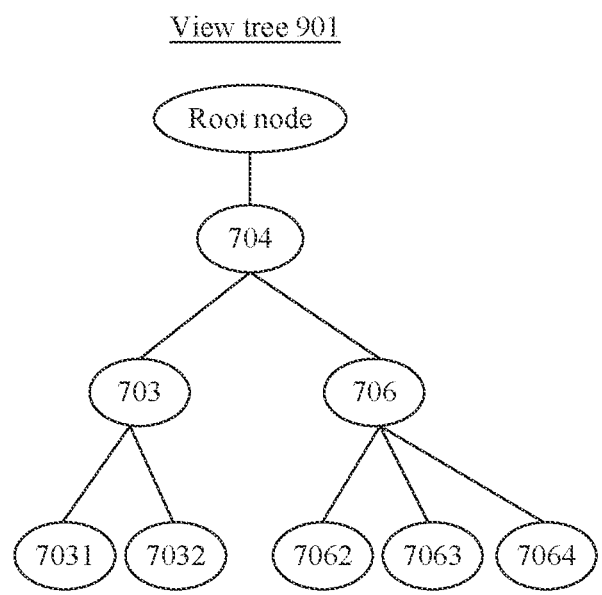
FIG. 9 is a schematic diagram 6 of an application scenario of a screen mirroring display method according to an embodiment of this application.

FIG. 9 is a schematic diagram of the view tree 901 of the screen mirroring interface. In the view tree 901, the mobile phone deletes a node in the view tree 801 that is not a target control, for example, the base map 701, the status bar 702, the controls in the status bar 702, and the progress bar 7601 in the control bar 706. In addition, if the configuration file 1 records a case in which the target controls in the title bar 703 and the control bar 706 are located above a layer of the album cover 704 after screen mirroring, the mobile phone may use the title bar 703 and the control bar 706 as child nodes of the album cover 704 in the view tree 901. In addition, child nodes of the title bar 703 include the song name 7031 and the singer 7041, and child nodes of the control bar 706 include the pause button 7062, the "previous" button 7063, and the "next" button 7064.

In some other embodiments, after identifying the target controls in the music playback interface 501 by using the configuration file 1, the mobile phone may still use a layer relationship between the target controls in the music playback interface 501 to generate a view tree corresponding to the screen mirroring interface after screen mirroring. For example, the mobile phone may split the target controls from the view tree 801, and generate a new view tree, that is, a view tree corresponding to the screen mirroring interface, based on a layer relationship between the target controls in the view tree 801.

Further, the mobile phone (namely, the source device) may send a UI message to the smart watch (namely, the destination device) through the foregoing communications network 104. The UI message includes the view tree (for example, the view tree 901 and a drawing instruction and a drawing resource related to each control in the view tree 901) corresponding to the screen mirroring interface. For example, the mobile phone and the smart watch may establish a socket connection based on a TCP/IP. Further, the mobile phone may send a UI message corresponding to the music playback interface 501 to the smart watch through the socket connection. Because the UI message includes only information about the target control, compared with sending, by the mobile phone, the entire music playback interface 501 to the smart watch for screen mirroring, the screen mirroring method provided in this embodiment of this application can reduce transmission bandwidth for interaction between the source device and the destination device and improve a transmission speed during screen mirroring.

Subsequently, when the mobile phone updates the music playback interface 501, the mobile phone may generate, according to the foregoing method, a UI message corresponding to a new display interface, and send the new UI message to the smart watch.

Figure 10:
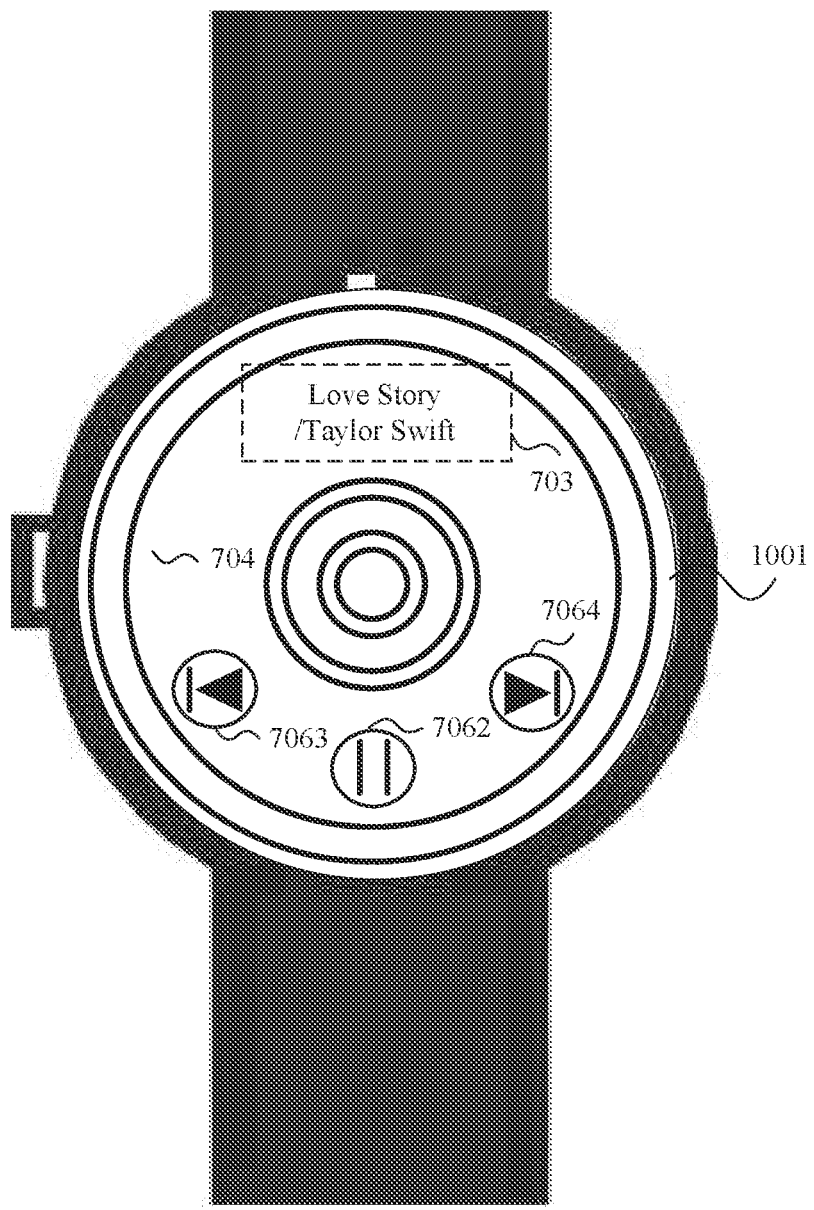
FIG. 10 is a schematic diagram 7 of an application scenario of a screen mirroring display method according to an embodiment of this application.

In some embodiments, after receiving the UI message corresponding to the music playback interface 501, the smart watch may sequentially invoke drawing instructions of the target controls in the view tree 901 based on a layer relationship between the target controls in the view tree 901, to draw the target controls. Finally, as shown in FIG. 10, the smart watch may draw a screen mirroring interface 1001 that exists after screen mirroring is performed on the music playback interface 501. Controls in the screen mirroring interface 1001 are in a one-to-one correspondence with the controls in the view tree 901.

For example, the smart watch may also store configuration files of different display interfaces, or the smart watch may obtain configuration files of different display interfaces from the server. The UI message sent by the mobile phone may further carry an identifier of the music playback interface 501. Further, the smart watch may find a corresponding configuration file (for example, the configuration file 1) based on the identifier of the music playback interface 501. Therefore, when drawing the screen mirroring interface 1001, the destination device may determine a drawing order of the target controls based on the layer relationship between the target controls in the view tree 901. For example, the destination device may determine, based on the view tree 901, to first draw the album cover 704 and then draw a child node (for example, the title bar 703) of the album cover 704. When drawing the album cover 704, the smart watch may further determine a specific drawing location of the album cover 704 based on a "dest" field of the album cover 704 in the configuration file 1. Further, the smart watch may invoke a drawing instruction corresponding to the album cover 704 to draw the album cover 704 at the location. Similarly, the smart watch may sequentially draw the target controls based on the layer relationship between the target controls in the view tree 901, to obtain the screen mirroring interface 1001 shown in FIG. 10.

The music playback interface 501 is still used as an example. Alternatively, the configuration file 1 of the music playback interface 501 may not include the "dest" field. When drawing the target control 1 in the music playback interface 501, the smart watch may determine the translation distances of the target control 1 on the x-axis and the y-axis based on the "translationx" field and the "translationy" field. For another example, the smart watch may determine the scale ratios of the target control 1 on the x-axis and the y-axis based on the "scalex" field and the "scaley" field. For another example, the smart watch may further determine the rotate degree of the target control 1 based on the "rotatedegree" field. In this case, the smart watch may also calculate a specific display location onto which the target control 1 is to be projected in the smart watch. Further, the smart watch may invoke a drawing instruction of the target control 1 to draw and display the target control 1 at the corresponding location.

It can be learned that when performing screen mirroring on the music playback interface 501 to the smart watch for display, the mobile phone may perform operations such as splitting, deleting, and recombination on controls in the music playback interface 501, so that the screen mirroring interface 1001 on which screen mirroring is finally performed in the smart watch can adapt to the display size of the display screen of the smart watch and a use requirement of the user, thereby improving a display effect and user experience of screen mirroring between a plurality of devices.

In some other embodiments of this application, alternatively, the mobile phone may simultaneously project a current display interface onto a plurality of destination devices for display.

Figure 11:
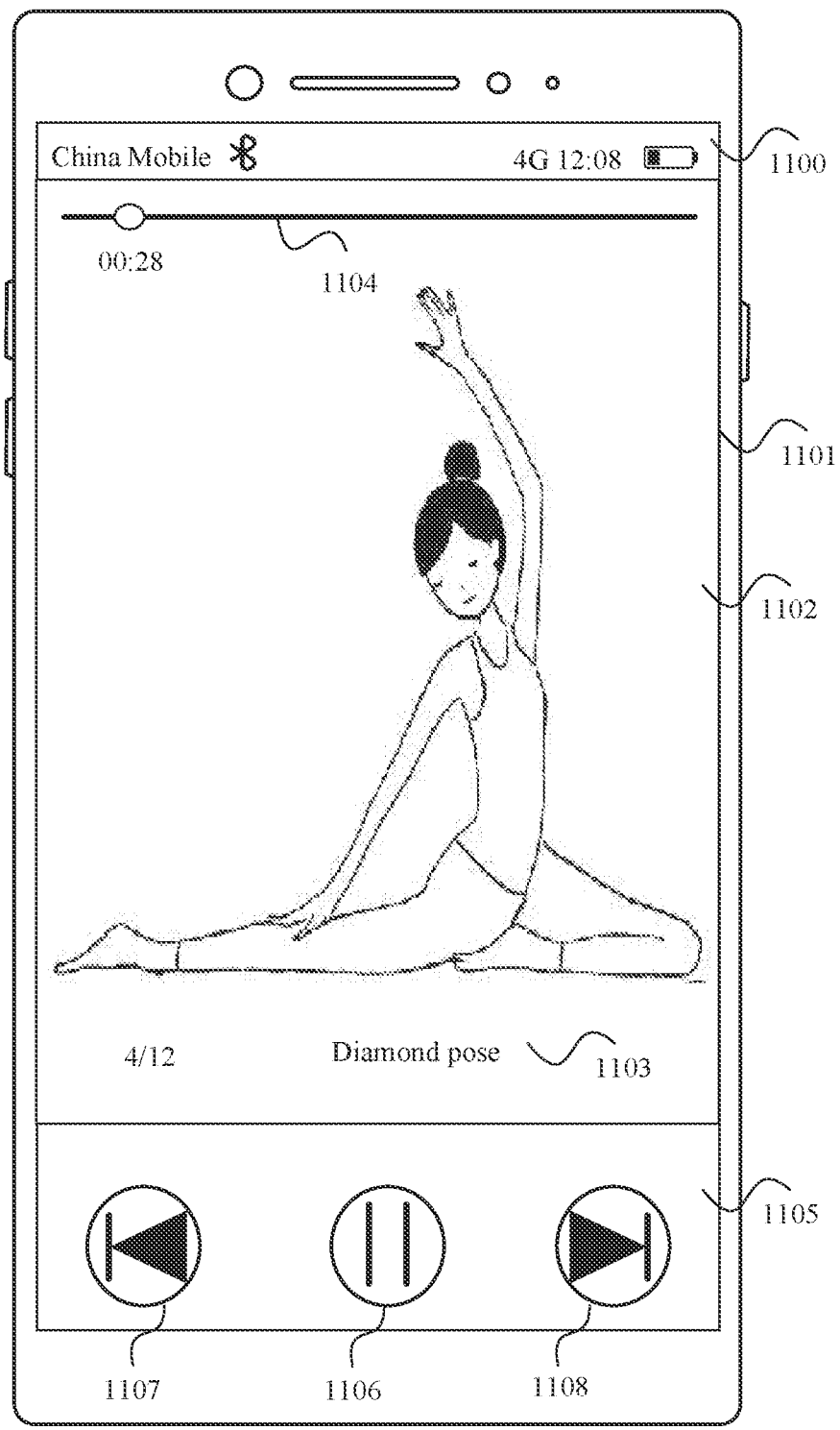
FIG. 11 is a schematic diagram 8 of an application scenario of a screen mirroring display method according to an embodiment of this application.

As shown in FIG. 11, when the mobile phone displays a video playback interface 1101 of a video APP, if it is detected that the user enables a screen mirroring function and selects the smart watch and the smart television as destination devices of current screen mirroring, the mobile phone may obtain a configuration file A that is preset for the smart watch and that corresponds to the video playback interface 1101 and a configuration file B that is preset for the smart television and that corresponds to the video playback interface 1101.

Similar to the method for identifying the target control in the music playback interface 501 by the mobile phone in the foregoing embodiment, the mobile phone may identify a first target control in the video playback interface 1101 based on an identifier of the first target control or a display location of the first target control before screen mirroring that is recorded in the configuration file A, and identify a second target control in the video playback interface 1101 based on an identifier of the second target control or a display location of the second target control before screen mirroring that is recorded in the configuration file B. The first target control corresponds to the smart watch, and the second target control corresponds to the smart television.

Figure 12:
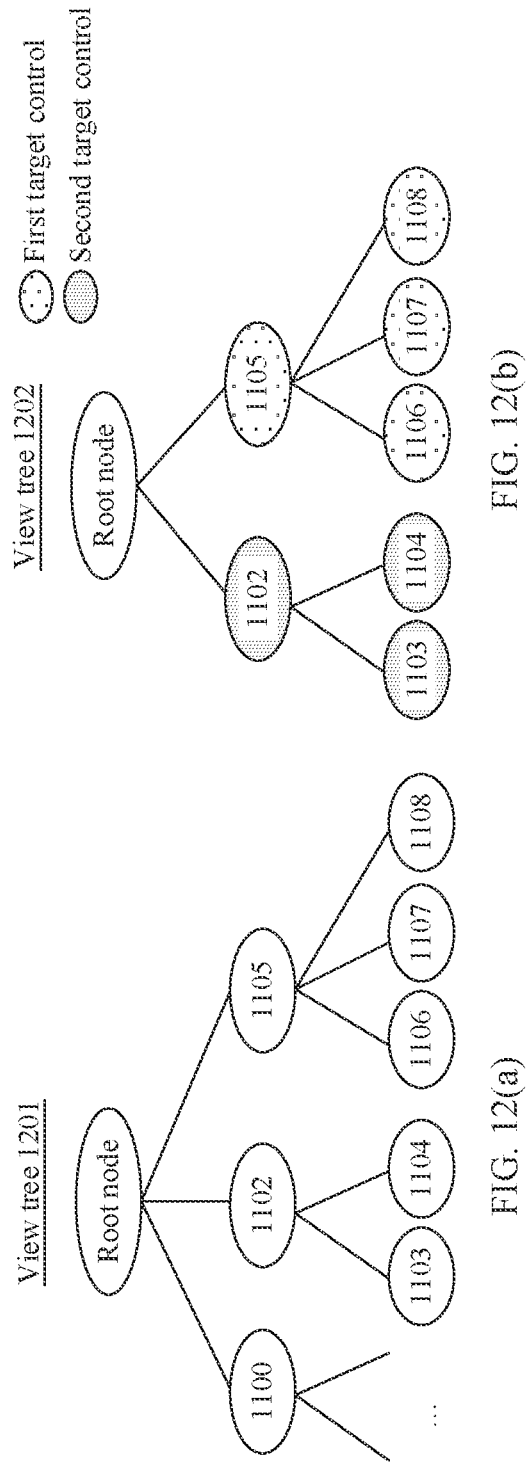
FIG. 12 is a schematic diagram 9 of an application scenario of a screen mirroring display method according to an embodiment of this application.

For example, still as shown in FIG. 11, the video playback interface 1101 includes a status bar 1100, a video image 1102, a text control 1103, a progress bar 1104, and a control bar 1105. The control bar 1105 includes a pause button 1106, a "previous" button 1107, and a "next" button 1108. As shown in (a) in FIG. 12, a view tree 1201 corresponding to the video playback interface 1101 includes a root node and the status bar 1100, the video image 1102, and the control bar 1105 that are located under the root node. The video image 1102 includes two child nodes named the text control 1103 and the progress bar 1104, and the control bar 1105 includes three child nodes named the pause button 1106, the "previous" button 1107, and the "next" button 1108.

For example, the mobile phone may identify, by using the configuration file A, that first target controls in the video playback interface 1101 that are to be projected onto the smart watch are the control bar 1105 and the child nodes of the control bar 1105, and the mobile phone may identify, by using the configuration file B, that second target controls in the video playback interface 1101 that are to be projected onto the smart television are the video image 1102 and the child nodes of the video image 1102.

Therefore, the mobile phone may use a union set of the first target controls and the second target controls in a view tree 1201 as a view tree that currently needs to be sent. As shown in (b) in FIG. 12, after deleting a non-target control (namely, the status bar 1100) in the view tree 1201, the mobile phone may obtain a view tree 1202 including the first target controls and the second target controls. Further, the mobile phone may send a UI message to the smart watch and the smart television through the foregoing communications network 104. The UI message not only includes drawing instructions and drawing resources related to the first target controls, but also includes drawing instructions and drawing resources related to the second target controls. Certainly, the UI message may further include the view tree 1202.

Figure 13:
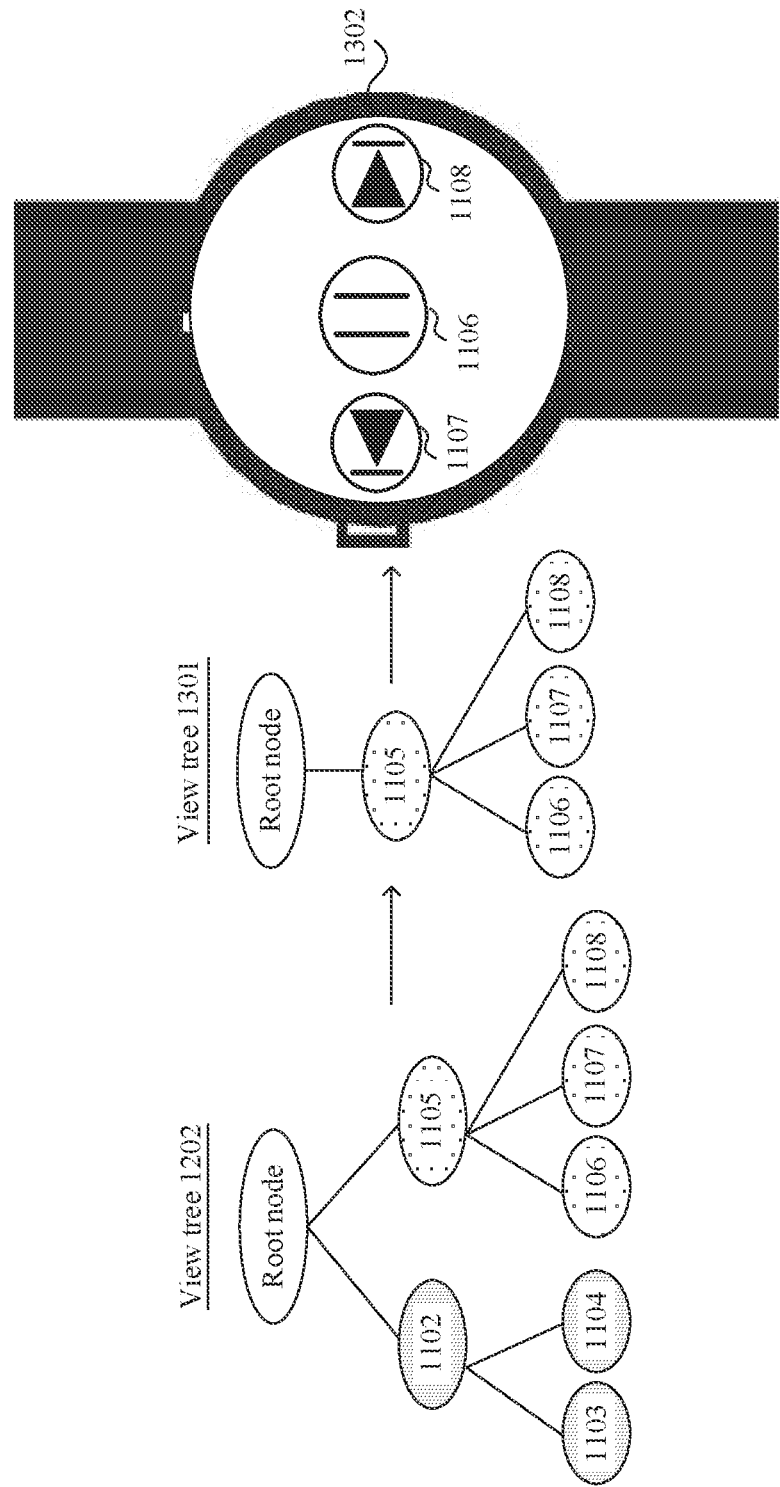
FIG. 13 is a schematic diagram 10 of an application scenario of a screen mirroring display method according to an embodiment of this application.

For example, the smart watch may prestore the configuration file A corresponding to the video playback interface 1101, or after receiving the UI message, the smart watch may obtain the corresponding configuration file A from the server. Further, as shown in FIG. 13, the smart watch may perform operations such as splitting, clipping, and recombination on the view tree 1202 based on the first target controls recorded in the configuration file A, to generate a view tree 1301 of a first screen mirroring interface displayed on the smart watch after screen mirroring. For example, the view tree 1301 includes the control bar 1105 located under a root node, and child nodes of the control bar 1105 are the pause button 1106, the "previous" button 1107, and the "next" button 1108.

Further, the smart watch may draw, based on the view tree 1301 and specific locations that are of the target controls in the screen mirroring interface after screen mirroring and that are recorded in the configuration file A, each first target control at a corresponding location by using a corresponding drawing instruction, to display a first screen mirroring interface 1302 shown in FIG. 13. In other words, after the mobile phone performs screen mirroring on the video playback interface 1101 to the smart watch, a related control of the control bar in the video playback interface 1101 is displayed on the smart watch.

Figure 14:
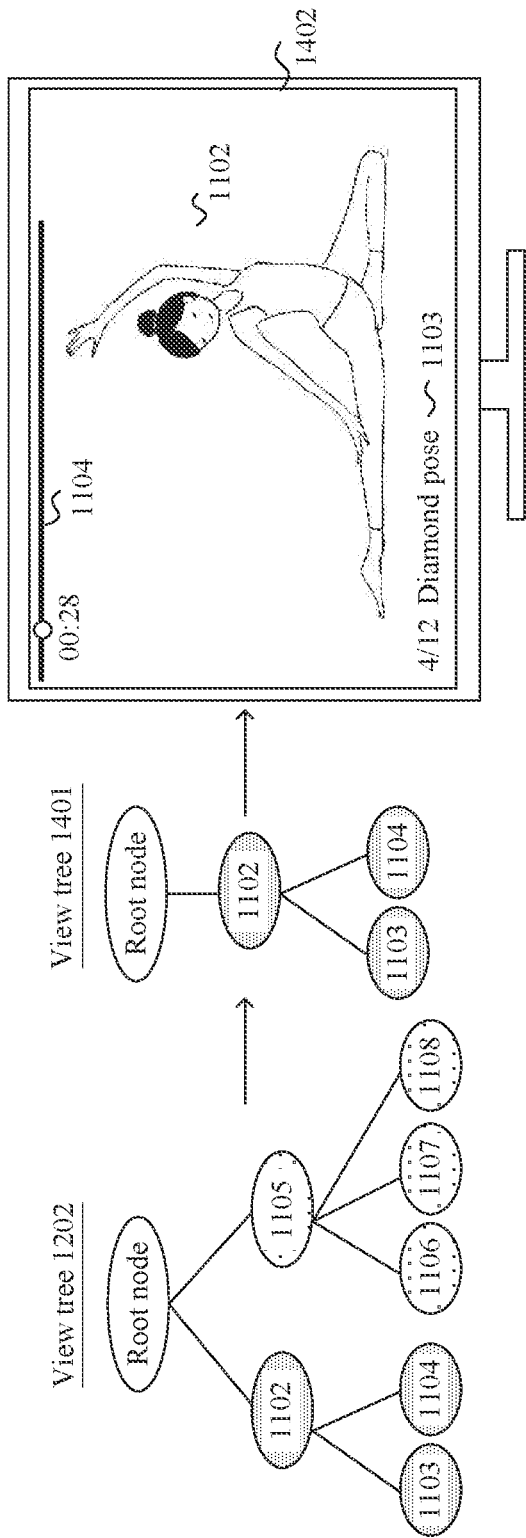
FIG. 14 is a schematic diagram 11 of an application scenario of a screen mirroring display method according to an embodiment of this application.

Similarly, the smart television may also prestore the configuration file B corresponding to the video playback interface 1101, or after receiving the UI message, the smart television may obtain the corresponding configuration file B from the server. Further, as shown in FIG. 14, the smart television may perform operations such as splitting, clipping, and recombination on the view tree 1202 based on the second target controls recorded in the configuration file B, to generate a view tree 1401 of a second screen mirroring interface displayed on the smart television after screen mirroring. For example, the view tree 1401 includes the video image 1102 located under a root node, and child nodes of the video image 1102 are the text control 1103 and the progress bar 1104.

Further, the smart television may draw, based on the view tree 1401 and specific locations that are of the target controls in the screen mirroring interface after screen mirroring and that are recorded in the configuration file B, each second target control at a corresponding location by using a corresponding drawing instruction, to display a second screen mirroring interface 1402 shown in FIG. 14. In other words, after the mobile phone performs screen mirroring on the video playback interface 1101 to the smart television, a related control of the video image in the video playback interface 1101 is displayed on the smart television.

Figure 15:
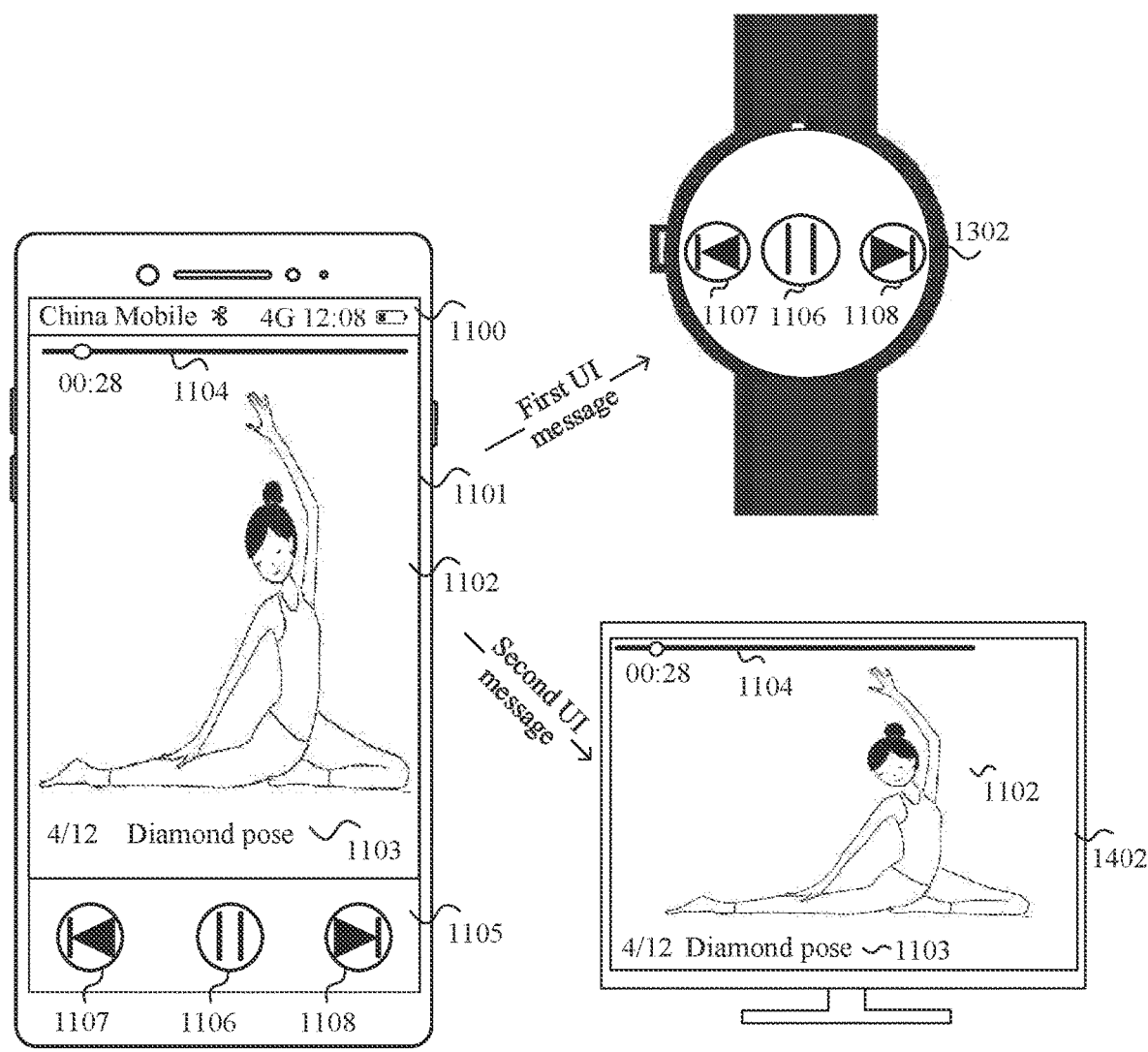
FIG. 15 is a schematic diagram 12 of an application scenario of a screen mirroring display method according to an embodiment of this application.

In some other embodiments, as shown in FIG. 15, after obtaining the view tree 1201 of the video playback interface 1101, the mobile phone may alternatively generate, based on the configuration file A, the view tree 1301 corresponding to the smart watch, and generate, based on the configuration file B, the view tree 1401 corresponding to the smart television. Further, the mobile phone may send a first UI message to the smart watch, where the first UI message includes the view tree 1301 and a drawing instruction of each control in the view tree 1301, so that the smart watch can draw and display the first screen mirroring interface 1302 based on the view tree 1301. Correspondingly, the mobile phone may send a second UI message to the smart television, where the second UI message includes the view tree 1401 and a drawing instruction of each control in the view tree 1401, so that the smart television can draw and display the second screen mirroring interface 1402 based on the view tree 1401.

It can be learned that when projecting a same display image onto different destination devices, the mobile phone may split, delete, and recombine controls in the display image, so that different screen mirroring interfaces are displayed on different destination devices, to adapt to a device characteristic such as screen sizes of different destination devices, thereby improving a display effect and user experience during screen mirroring.

In some other embodiments of this application, the user may alternatively manually specify, in a display interface of the source device, a target control on which screen mirroring to the destination device is to be performed. In this way, the source device can perform screen mirroring on one or more target controls manually specified by the user onto the destination device for display.

Figure 16:
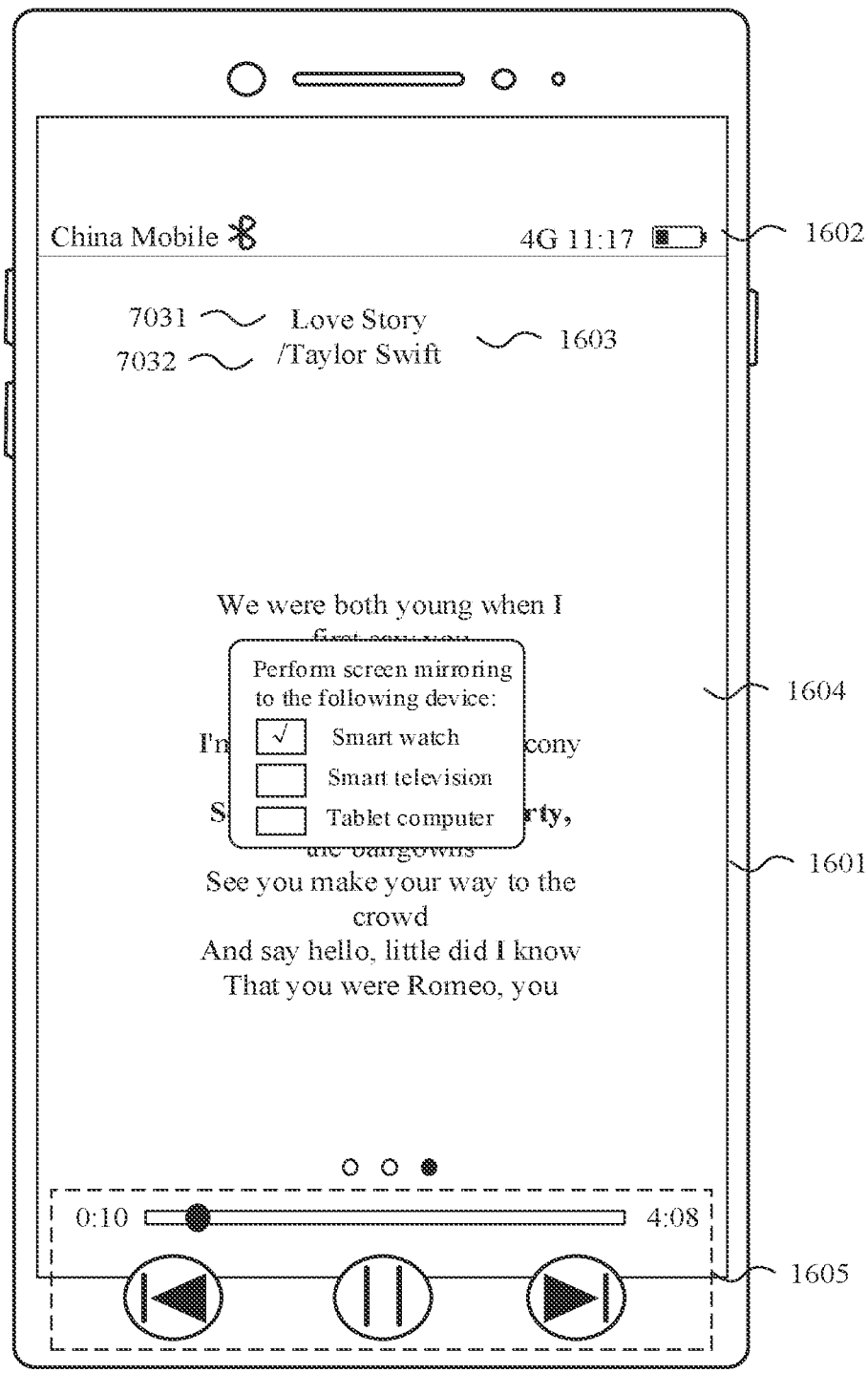
FIG. 16 is a schematic diagram 13 of an application scenario of a screen mirroring display method according to an embodiment of this application.

Still for example, the mobile phone is a source device. As shown in FIG. 16, the mobile phone is displaying a lyrics browsing interface 1601 in a music APP. After the user enables the screen mirroring function in the mobile phone, the mobile phone may display, in a prompt box, a plurality of candidate devices that support current screen mirroring. If it is detected that the user selects a smart watch in the prompt box, it indicates that the user expects to project the currently displayed lyrics browsing interface 1601 onto the smart watch for display. In this case, the mobile phone may obtain a package name of the music APP and an activity name of the lyrics browsing interface 1601, and the mobile phone may search a plurality of configuration files corresponding to the smart watch for a configuration file (for example, a configuration file 2) corresponding to the package name and the activity name. Similar to the foregoing configuration file 1, the configuration file 2 records one or more target controls that are in the browsing interface 160I and on which screen mirroring to the smart watch may be performed for display.

The browsing interface 1601 shown in FIG. 16 includes the following controls, a status bar 1602, a title bar 1603, lyrics 1604, and a control bar 1605. The control bar 1605 includes controls such as a progress bar, a pause button, a "previous" button, and a "next" button. The title bar 1603 includes controls such as a song name and a singer. The status bar 1602 includes controls such as time, signal strength, and a battery capacity.

Figure 17A:
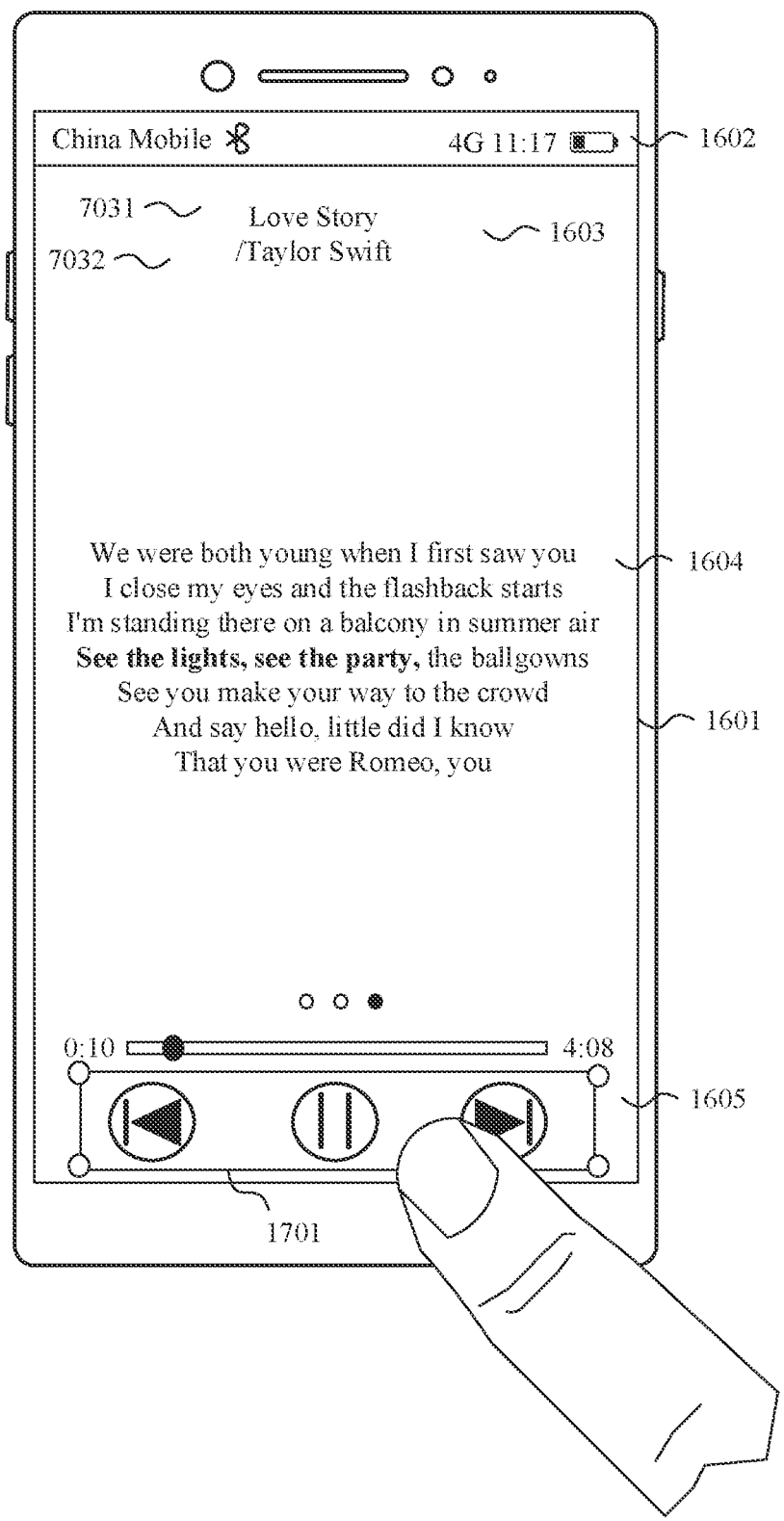
FIG. 17(a) and FIG. 17(b) are a schematic diagram 14 of an application scenario of a screen mirroring display method according to an embodiment of this application.
Figure 17B:
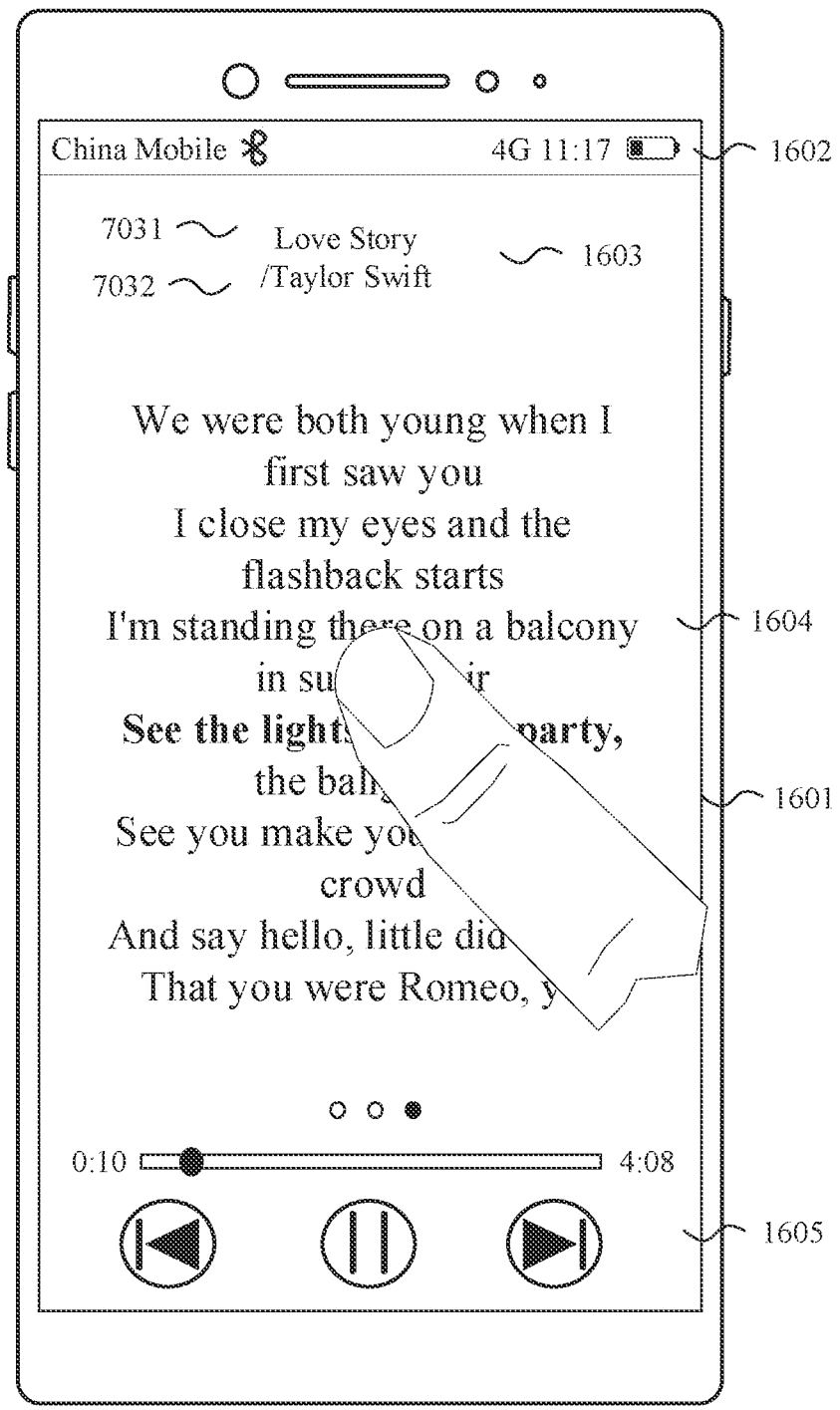

After detecting that the user selects the smart watch as a destination device, the mobile phone may display one or more selection boxes 1701 in the browsing interface 1601, as shown in FIG. 17(*a*). The selection box 1701 may be used to select a target control to be projected onto the smart watch. For example, the user may adjust a size and a location of the selection box 1701 in the browsing interface 1601 to select a target control that the user currently expects to project onto the smart watch. Still as shown in FIG. 17(*a*), after selecting a first region in the browsing interface 1601 by using the selection box 1701, the user may perform a preset operation to trigger the mobile phone to start to perform screen mirroring. For example, the preset operation may be an operation such as double-tapping the first region or pressing the first region by the user. For another example, the mobile phone may display a completion button near the selection box 1701. After selecting the first region by using the selection box 1701, the user may tap the completion button to trigger the mobile phone to start to perform screen mirroring.

For example, after the user selects the first region in the browsing interface 1601 by using the selection box 1701, the mobile phone may detect specific coordinates of the first region in the selection box 1701 in the browsing interface 1601. Further, the mobile phone may determine, based on the configuration file 2, whether the first region matches the target control recorded in the configuration file 2. For example, when the coordinates of the first region are the same as or close to coordinates of a target control (for example, a target control 1) in the configuration file 2, the mobile phone may determine that the first region matches the target control 1 in the configuration file 2.

Alternatively, after it is detected that the user selects the smart watch as a destination device, the user may tap or select, in the browsing interface 1601, a region on which screen mirroring needs to be performed, as shown in FIG. 17(*b*). In an example in which the user taps a point A in the browsing interface 1601, the mobile phone may find, in the configuration file 2 based on coordinates of the point A, that a target control to which the point A belongs is a target control 1.

Figure 18:
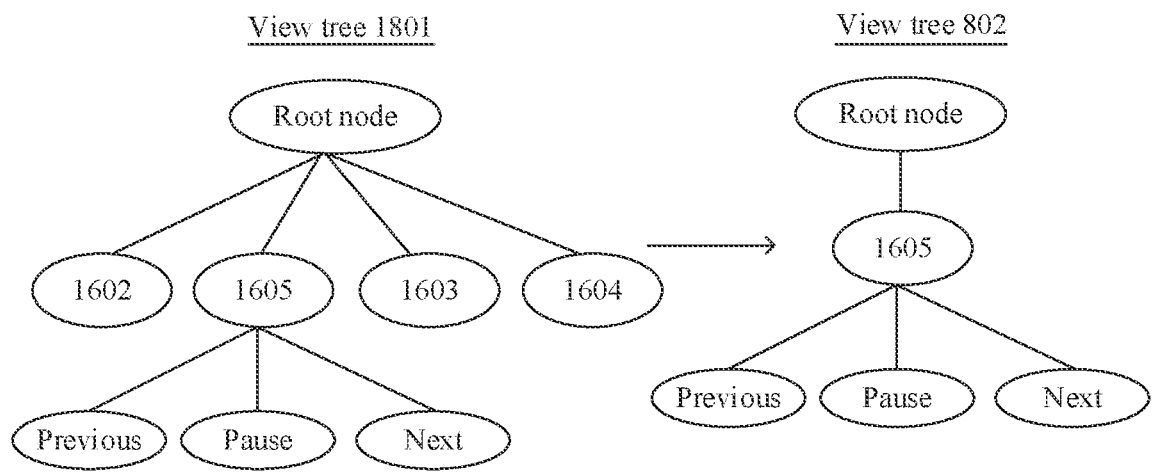
FIG. 18 is a schematic diagram 15 of an application scenario of a screen mirroring display method according to an embodiment of this application.

In other words, the mobile phone may determine, in the configuration file 2 in response to a manual operation of the user, one or more target controls on which the user currently needs to perform screen mirroring. Further, similar to the screen mirroring method in the foregoing embodiment, as shown in FIG. 18, the mobile phone may generate, based on a view tree 1801 of the browsing interface 1601 and the target control selected by the user in the configuration file 2, a view tree 1802 of a screen mirroring interface that exists after screen mirroring. For example, the view tree 1802 includes the controls in the control bar 1605 that are currently manually selected by the user.

Figure 19:
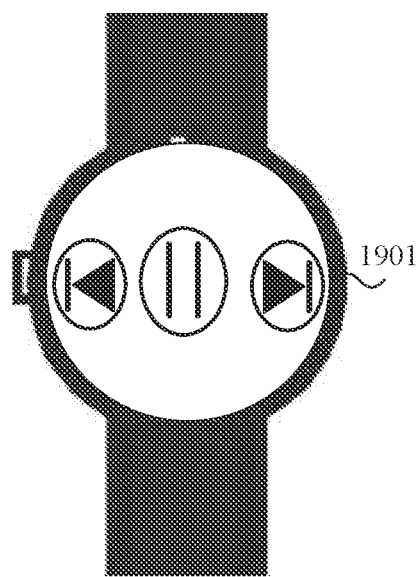
FIG. 19 is a schematic diagram 16 of an application scenario of a screen mirroring display method according to an embodiment of this application.

The mobile phone may add the view tree 1802 and a drawing instruction of the target control in the view tree 1802 to a UI message, and send the UI message to the smartphone. As shown in FIG. 19, after receiving the UI message, the smartphone may invoke a drawing instruction of a corresponding control based on a layer order of the controls in the view tree 1802, to draw the controls in the control bar 1605 in a display screen of the smartphone, to obtain a screen mirroring interface 1901 after screen mirroring.

In some other embodiments, after the mobile phone enables a screen mirroring mode, if it is detected that the user manually selects one or more controls in a current display interface, the mobile phone may use, as target controls of current screen mirroring, the controls selected by the user, and dynamically generate a configuration file corresponding to the target controls. For example, the mobile phone may record, in the dynamically generated configuration file, a specific location of each target control selected by the user, and in addition, the mobile phone may further set, in the configuration file, a specific display location of each target control in a destination device of current screen mirroring based on parameters such as resolution and a screen size of the destination device.

Further, similar to the screen mirroring method in the foregoing embodiment, the mobile phone may generate a view tree of a subsequent screen mirroring interface based on the dynamically generated configuration file, and add the view tree and a related drawing instruction to a UI message and send the UI message to the destination device. In addition, the mobile phone may further send the currently dynamically generated configuration file to the destination device. Therefore, based on the dynamically generated configuration file, the destination device may invoke a drawing instruction at a corresponding display location to draw the target control manually selected by the user. In this way, in a screen mirroring process, the user can manually select content that is in a display interface of the source device and that is to be projected onto the destination device for display, so that it is more flexible to display the display interface between a plurality of devices, thereby improving user experience during screen mirroring.

An embodiment of this application discloses an electronic device, including a processor and a memory, an input device, an output device, and a communications module that are connected to the processor. The input device and the output device may be integrated into one device. For example, a touch sensor may be used as the input device, a display screen may be used as the output device, and the touch sensor and the display screen are integrated into a touchscreen.

Figure 20:
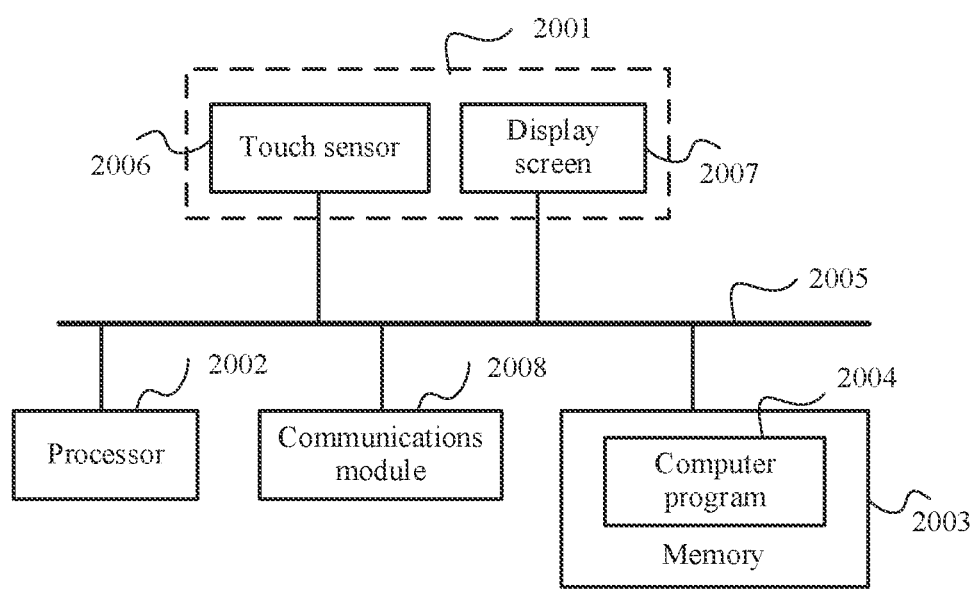
FIG. 20 is a schematic structural diagram 2 of an electronic device according to an embodiment of this application.

In this case, as shown in FIG. 20, the electronic device may include: a touchscreen 2001, where the touchscreen 2001 includes a touch sensor 2006 and a display screen 2007; one or more processors 2002; a memory 2003; a communications module 2008; one or more applications (not shown); and one or more computer programs 2004. The components may be connected through one or more communications buses 2005. The one or more computer programs 2004 are stored in the memory 2003 and configured to be executed by the one or more processors 2002. The one or more computer programs 2004 include instructions, and the instructions may be used to perform the steps in the foregoing embodiments. All content related to each step in the foregoing method embodiments may be cited in function descriptions of a corresponding entity component. Details are not described herein again.

For example, the processor 2002 may be specifically the processor 110 shown in FIG. 2, the memory 2003 may be specifically the internal memory 121 and/or the external memory 120 shown in FIG. 2, the display screen 2007 may be specifically the display screen 194 shown in FIG. 2, the touch sensor 2006 may be specifically the touch sensor in the sensor module 180 shown in FIG. 2, and the communications module 2008 may be specifically the mobile communications module 150 and/or the wireless communications module 160 shown in FIG. 2. This is not limited in this embodiment of this application.

The foregoing descriptions about implementations allow a person skilled in the art to clearly understand that, for the purpose of convenient and brief description, division into the foregoing functional modules is used as an example for illustration. In an actual application, the foregoing functions may be allocated to different functional modules and implemented based on a requirement, in other words, an inner structure of an apparatus is divided into different functional modules to implement all or some of the functions described above. For a detailed working process of the foregoing system, apparatus, and unit, refer to a corresponding process in the foregoing method embodiments. Details are not described herein again.

Functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A method implemented by a first electronic device, wherein the method comprises:
    displaying a first display interface;
    receiving, from a user, a screen mirroring instruction for projecting the first display interface onto a second electronic device;
    obtaining based on a type of the second electronic device, a configuration file corresponding to the first display interface,
    determining, in response to the screen mirroring instruction and based on the configuration file, a first target control in the first display interface; and
    sending a first message to the second electronic device,
    wherein the first message comprises a first drawing instruction of the first target control to prompt the second electronic device to draw a first screen mirroring interface according to the first drawing instruction, and
    wherein the first screen mirroring interface comprises the first target control.

2. The method of claim 1, wherein the configuration file records the first target control on which screen mirroring needs to be performed in the first display interface.

3. The method of claim 2, wherein the configuration file records an identifier or a display location of the first target control, and wherein the method further comprises determining, the first target control based on the identifier or the display location.

4. The method of claim 1, wherein after determining the first target control, the method further comprises:
    obtaining first view information for drawing the first display interface, wherein the first view information comprises a first layer order of first target controls in the first display interface; and
    determining second view information based on the first view information, wherein the second view information comprises a second layer order of second target controls in the first screen mirroring interface, and wherein the first message further comprises the second view information, to prompt the second electronic device to draw the first screen mirroring interface based on the second view information and the first drawing instruction.

5. The method of claim 4, further comprising splitting and recombining the first target controls in the first view information to obtain the second view information, wherein the first layer order and the second layer order are the same.

6. The method of claim 4, wherein the configuration file further records display locations of the second target controls, and wherein the method further comprises:
    splitting the first target controls from the first view information; and
    recombining the first target controls based on the display locations to obtain the second view information.

7. The method of claim 1, wherein the first message further comprises a drawing resource of the first target control, and wherein the drawing resource configured for drawing a user interface of the first target control when executing the first drawing instruction.

8. The method of claim 1, wherein after displaying the first display interface, the method further comprises:
    receiving, from the user, a second screen mirroring instruction for projecting the first display interface onto a third electronic device;
    determining, in response to the second screen mirroring instruction, a second target control in the first display interface; and
    sending a second message to the third electronic device, wherein the second message comprises a second drawing instruction of the second target control; or
    sending the first message to the third electronic device, wherein the first message further comprises the second drawing instruction.

9. An electronic device, comprising:
    a touchscreen;
    a processor coupled to the touchscreen;
    a memory coupled to the touchscreen and the processor and configured to store instructions, wherein when executed by the processor the instructions cause the electronic device to:
    display a first display interface;
    receive, from a user, a screen mirroring instruction for projecting the first display interface onto a second electronic device;
    obtain, based on a type of the second electronic device, a configuration file corresponding to the first display interface;
    determine, in response to the screen mirroring instruction and based on the configuration file, a first target control in the first display interface; and
    send a first message to the second electronic device, wherein the first message comprises a drawing instruction of the first target control to prompt the second electronic device to draw a first screen mirroring interface according to the drawing instruction, and wherein the first screen mirroring interface comprises the first target control.

10. The electronic device of claim 9, wherein the configuration file records the first target control on which screen mirroring needs to be performed in the first display interface.

11. The electronic device of claim 10, wherein the configuration file records an identifier or a display location of the first target control, and wherein when executed by the processor, the instructions further cause the electronic device to determine the first target control based on the identifier or the display location.

12. The electronic device of claim 9, wherein when executed by the processor, the instructions further cause the electronic device to:
obtain first view information for drawing the first display interface, wherein the first view information comprises a first layer order of first target controls in the first display interface; and
determine a second view information based on the first view information, wherein the second view information comprises a second layer order of second target controls in the first screen mirroring interface, and wherein the first message further comprises the second view information to prompt the second electronic device to draw the first screen mirroring interface based on the second view information and the drawing instruction.

13. The electronic device according to claim 12, wherein when executed by the processor, the instructions further cause the electronic device to split and recombine the first target controls in the first view information to obtain the second view information, wherein the first layer order and the second layer order are the same.

14. The electronic device of claim 12, wherein the configuration file further records display locations of the second target controls in the first screen mirroring interface, and wherein when executed by the processor, the instructions further cause the electronic device to:
split the first target controls from the first view information; and
recombine the first target controls based on the display locations to obtain the second view information.

15. The electronic device of claim 9, wherein the first message further comprises a drawing resource of the first target control, and wherein the drawing resource is used by the second electronic device to draw a user interface of the first target control when the second electronic device executes the drawing instruction.

16. The electronic device according to claim 9, wherein when executed by the processor, the instructions further cause the electronic device to:
receive, from the user, a second screen mirroring instruction for projecting the first display interface onto a third electronic device;
determine in response to the second screen mirroring instruction a second target control in the first display interface; and
send a second message to the third electronic device, wherein the second message comprises a second drawing instruction of the second target control; or
send the first message to the third electronic device, wherein the first message further comprises the second drawing instruction.

17. A computer program product comprising computer-executable instruction that are stored on a non-transitory computer-readable storage medium and that, when executed by a processor, cause an electronic device to:
display a first display interface;
receive, from a user, a screen mirroring instruction for projecting the first display interface onto a second electronic device;
obtain, based on a type of the second electronic device, a configuration file corresponding to the first display interface;
determine, in response to the screen mirroring instruction and based on the configuration file, a first target control in the first display interface; and
send a first message to the second electronic device,
wherein the first message comprises a drawing instruction of the first target control to prompt the second electronic device to draw a first screen mirroring interface according to the drawing instruction, and
wherein the first screen mirroring interface comprises the first target control.

18. The computer program product of claim 17, wherein the configuration file records an identifier or a display location of the first target control, and wherein the computer-executable instructions further cause the electronic device to determine the first target control based on the identifier or the display location.

19. The computer program product of claim 17, wherein the computer-executable instructions further cause the electronic device to:
obtain first view information for drawing the first display interface, wherein the first view information comprises a first layer order of first target controls in the first display interface; and
determine a second view information based on the first view information, wherein the second view information comprises a second layer order of second target controls in the first screen mirroring interface, and wherein the first message further comprises the second view information to prompt the second electronic device to draw the first screen mirroring interface based on the second view information and the drawing instruction.

20. The computer program product of claim 19, wherein the computer-executable instructions further cause the electronic device to split and recombine the first target controls in the first view information to obtain the second view information, wherein the first layer order and the second layer order are the same.

* * * * *

UNITED STATES PATENT AND TRADEMARK OFFICE
CERTIFICATE OF CORRECTION

| | | |
|---|---|---|
| PATENT NO. | : 11,880,628 B2 | Page 1 of 1 |
| APPLICATION NO. | : 17/616901 | |
| DATED | : January 23, 2024 | |
| INVENTOR(S) | : Zhenhua Fan, Yuan Cao and Xi Wei | |

It is certified that error appears in the above-identified patent and that said Letters Patent is hereby corrected as shown below:

In the Claims

Claim 3, Column 27, Line 60: "mining, the first target control based on the identifier or the" should read "mining the first target control based on the identifier or the"

Claim 4, Column 28, Line 6: "information, to prompt the second electronic device to" should read "information to prompt the second electronic device to"

Claim 9, Column 28, Line 46: "executed by the processor the instructions cause the" should read "executed by the processor, the instructions cause the"

Claim 17, Column 30, Line 5: "executable instruction that are stored on a non-transitory" should read "executable instructions that are stored on a non-transitory"

Signed and Sealed this
Nineteenth Day of March, 2024

Katherine Kelly Vidal
*Director of the United States Patent and Trademark Office*